US012507885B2

(12) United States Patent
Leung et al.

(10) Patent No.: US 12,507,885 B2
(45) Date of Patent: Dec. 30, 2025

(54) METHODS AND SYSTEMS FOR ESTIMATING VISUAL FIELD SENSITIVITIES FROM RETINAL OPTICAL TEXTURE ANALYSIS (ROTA) MAPS

(71) Applicant: AIROTA DIAGNOSTICS LIMITED, Hong Kong (CN)

(72) Inventors: Kai-Shun Christopher Leung, Hong Kong (CN); Ka-Ngai Alexander Lam, Hong Kong (CN)

(73) Assignee: AIROTA DIAGNOSTICS LIMITED, Hong Kong (CN)

( * ) Notice: Subject to any disclaimer, the term of this patent is extended or adjusted under 35 U.S.C. 154(b) by 817 days.

(21) Appl. No.: 17/845,852

(22) Filed: Jun. 21, 2022

(65) Prior Publication Data
US 2022/0400942 A1 Dec. 22, 2022

Related U.S. Application Data

(60) Provisional application No. 63/213,469, filed on Jun. 22, 2021.

(51) Int. Cl.
*A61B 3/02* (2006.01)
*A61B 3/00* (2006.01)
*G06T 7/00* (2017.01)

(52) U.S. Cl.
CPC .............. *A61B 3/02* (2013.01); *A61B 3/0025* (2013.01); *G06T 7/0012* (2013.01); *G06T 2207/10101* (2013.01); *G06T 2207/30041* (2013.01)

(58) Field of Classification Search
None
See application file for complete search history.

(56) References Cited

U.S. PATENT DOCUMENTS 9,357,911 B2 6/2016 Bizios et al.
10,918,275 B2 2/2021 Leung et al.
2022/0331092 A1* 10/2022 Campin ............... A61B 3/0025

FOREIGN PATENT DOCUMENTS

WO WO 2021043980 A1 3/2021

OTHER PUBLICATIONS

Airota Diagnostics Limited, International Search Report and Written Opinion, PCT/IB2022/000351, Nov. 25, 2022, 8 pgs.
Airota Diagnostics Limited, International Preliminary Report on Patentability, PCT/IB2022/000351, Dec. 14, 2023, 6 pgs.

* cited by examiner

*Primary Examiner* — Thomas D Lee
(74) *Attorney, Agent, or Firm* — Morgan, Lewis & Bockius LLP

(57) ABSTRACT

Disclosed techniques evaluate the visual field of a patient's eye using deep learning techniques. A computer system obtains a plurality of cross-sectional scan images of a retina captured by an optical coherence tomography (OCT) device. The retina has an inner retinal layer. A retinal optical texture analysis (ROTA) map of the inner retinal layer is generated from the plurality of cross-sectional scan images. The ROTA map includes a plurality of pixels, and each pixel of the ROTA map corresponds to a respective optical texture signature value S providing information about tissue composition and optical density of the inner retinal layer at a respective retinal location. The computer system applies a machine learning model to process the ROTA map of the inner retinal layer to determine visual field sensitivity of the retina.

20 Claims, 22 Drawing Sheets

METHODS AND SYSTEMS FOR ESTIMATING VISUAL FIELD SENSITIVITIES FROM RETINAL OPTICAL TEXTURE ANALYSIS (ROTA) MAPS

RELATED APPLICATION

This application claims priority to U.S. Provisional Patent Application No. 63/213,469, titled "Machine Learning-Based Method and System for Estimating Visual Field Sensitivities from Inner Retina Optical Texture Analysis Map," filed on Jun. 22, 2021, which is hereby incorporated by reference in its entirety.

TECHNICAL FIELD

The present application generally relates to retinal imaging techniques, including methods and systems for using deep learning techniques to estimate visual field sensitivity of a patent's eye based on cross-sectional scan images of the retina or a related algorithm-processed image.

BACKGROUND

Eye diseases such as glaucoma oftentimes cause visual field losses that adversely affect the quality of life of patients. Optical coherence tomography (OCT) provides an objective solution to determine structural integrity of optic nerve and macula of human eye, while perimetry tests are applied to detect actual functional deficits in the visual field of the eye. The perimetry tests have become indispensable in diagnostic assessment of glaucoma, non-glaucomatous optic neuropathies, macula diseases, and many neurological diseases. Such perimetry tests are normally standardized for visual field examination and provide valuable information to evaluate the degree of functional impairment in human eyes. A perimetry test can systematically measure differential light sensitivity at various locations in the visual field of a patient's eye. However, a perimetry test has to be managed by an optometrist and requires the patient to respond to perimetric stimuli promptly and properly in a subjective way during the entire test, making measurement results inconsistent among different patients. It would be beneficial to have more efficient, objective, and consistent mechanisms to evaluate patients' visual function and detect visual field defects.

SUMMARY

Disclosed embodiments include systems and methods for applying machine learning to estimate visual field sensitivity of an eye based on retinal optical texture analysis (ROTA) map of an inner retinal layer. A retina includes a plurality of inner retinal layers (e.g., a retinal nerve fiber layer (RNFL), a ganglion cell layer (GCL), and an inner plexiform layer (IPL)). A ROTA map is generated from cross-sectional scan images of the retina captured by an OCT device, and includes information about tissue composition and optical density of any one of the inner retinal layers or a combination of one or more adjacent inner retinal layers. The ROTA map is further processed by a trained deep neural network (e.g., a convolutional neural network (CNN)) to estimate visual field sensitivity of the eye. A deep neural network can be used to approximate to any continuous function of input variables, and may provide a correlation model that is better than a predefined curvilinear model. In some embodiments, the deep neural network is trained using a training dataset including a plurality of pairs of ROTA maps and corresponding visual field sensitivity. The visual field sensitivity is measured using a perimetry test and applied as the ground truth during the course of training the deep neural network. With the trained deep neural network, visual field sensitivity of an eye can be determined based on an input ROTA map even without performing individual perimetry test. By these means, the visual field sensitivity is efficiently and accurately determined from OCT-based scan images via ROTA mapping and post processing, which is highly automated and involves little or no intervention by an optometrist or patient.

In one aspect, a method for evaluating visual field of a patient's eye is implemented at a computer system. The method includes obtaining a plurality of cross-sectional scan images of a retina captured by an OCT device. The retina has an inner retinal layer. The method further includes generating a retinal optical texture analysis (ROTA) map of the inner retinal layer from the plurality of cross-sectional scan images. The ROTA map includes a plurality of pixels, and each pixel of the ROTA map corresponds to a respective signature value S (also called optical texture signature value S) providing information about tissue composition and optical density of the inner retinal layer at a respective retinal location. The method further includes applying a machine learning model to process the ROTA map of the inner retinal layer to determine visual field sensitivity of the retina. In some embodiments, the visual field sensitivity of the retina includes one or more of: (1) one or more local visual field sensitivity values, each of which corresponds to a local sensitivity level of a distinct selected visual field location; (2) one or more regional visual field sensitivity indexes indicating a regional sensitivity level of a selected region of the retina; and (3) one or more global visual field sensitivity indexes indicating an overall sensitivity level of the retina.

According to another aspect of the present application, a computer system includes one or more processing units, memory and a plurality of programs stored in the memory. The programs, when executed by the one or more processing units, cause the computer system to perform the method for monitoring a visual field of a patient's eye as described above.

According to another aspect of the present application, a non-transitory computer readable storage medium stores a plurality of programs for execution by a computer system having one or more processing units. The programs, when executed by the one or more processing units, cause the computer system to perform the method for monitoring a visual field of a patient's eye as described above.

BRIEF DESCRIPTION OF DRAWINGS

The accompanying drawings are included to provide a further understanding of the embodiments, are incorporated herein, and constitute a part of the specification. The drawings illustrate the described embodiments and together with the description serve to explain the underlying principles. Like reference numerals refer to corresponding parts.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. It will be apparent to one of ordinary skill in the art that various alternatives may be used without departing from the scope of claims, and the subject matter may be practiced without these specific details. For example, it will be apparent to one of ordinary skill in the art that the subject matter presented herein can be implemented on many types of computer systems that support eye monitoring and diagnostic evaluation.

Disclosed embodiments apply a machine learning model to estimate visual field sensitivity of an eye based on a retinal optical texture analysis (ROTA) map of an inner retinal layer of the eye. The loss of visual field sensitivity is oftentimes caused by the loss of retinal ganglion cells and can be observed in glaucoma and non-glaucomatous optic neuropathies. Axons, soma, and dendrites of retinal ganglion cells reside in a retinal nerve fiber layer (RNFL), a ganglion cell layer (GCL), and an inner plexiform layer (IPL). Structural properties of these inner retinal layers are therefore monitored to estimate the functional sensitivity of the visual field. Specifically, parameters (e.g., thicknesses and optical reflectances) of these inner retinal layers are extracted from scan images of these inner retinal layers and applied to generate a ROTA map. ROTA outperforms other existing clinical methods in detection of inner retinal layer defect, and an inner retinal layer defect identified in a ROTA map oftentimes has strong association with a defect in the visual field of the corresponding eye. The ROTA map is further examined to detect inner retinal layer defects associated with glaucoma and non-glaucomatous optic neuropathies and predict visual field sensitivity of the corresponding retina. For example, a machine learning model is trained to determine a set of features (e.g., a visual sensitivity value at a specific visual field location) from a ROTA map. The trained machine training model is applied to process a ROTA map of an inner retinal layer of a patient's eye and estimate the visual field sensitivity of the eye. A visual field sensitivity of a retina is called a visual field sensitivity of an eye in an exchangeable manner in this application. By these means, the visual field sensitivity of the eye is automatically determined from the ROTA map with a high accuracy level, and an optometrist or ophthalmologist does not need to monitor the visual field sensitivity of the retina using a perimetry test (which is manually managed and relies on patient's frequent and proper responses).

Figure 1:
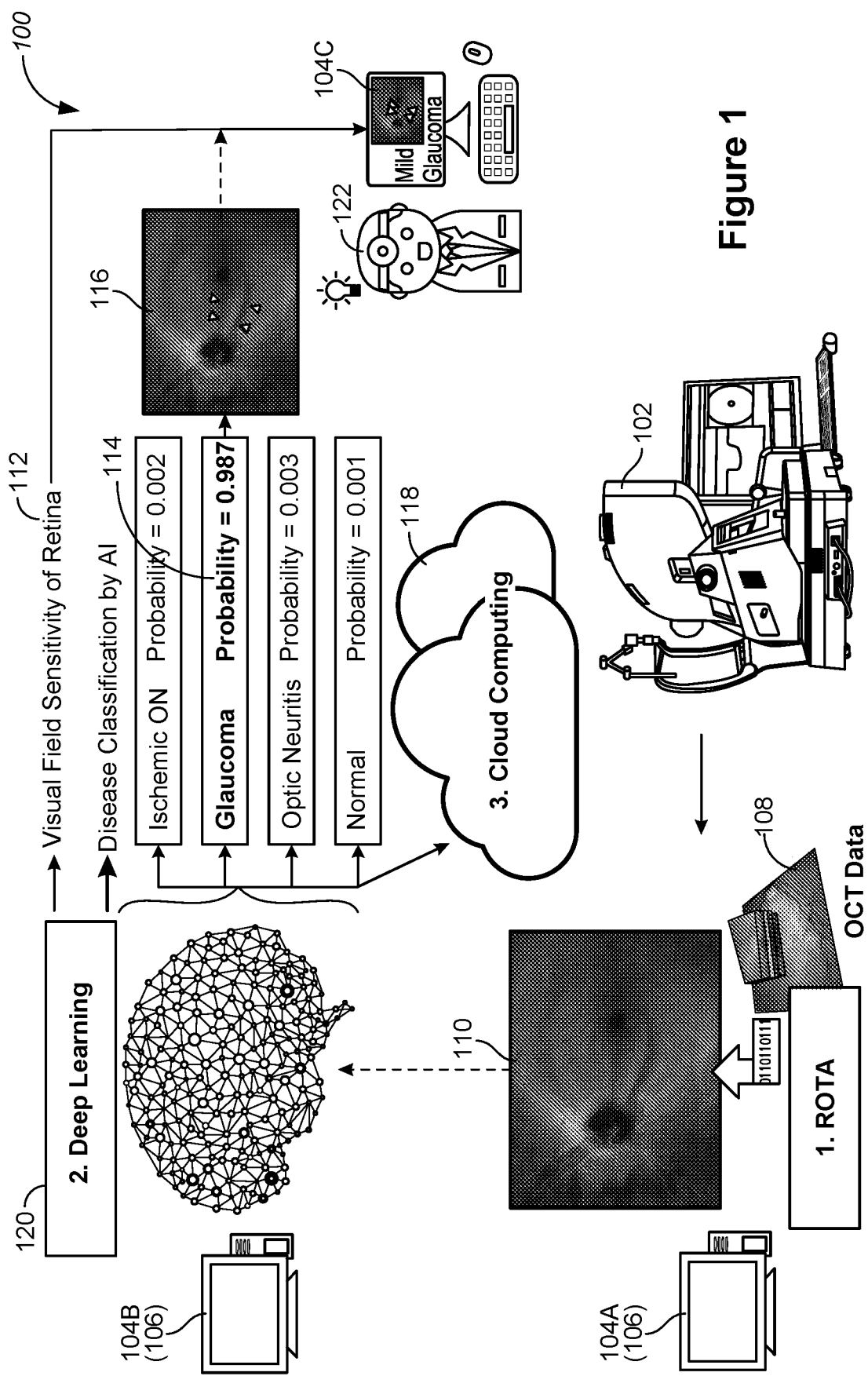
FIG. 1 is an example diagnostic evaluation platform on which visual field sensitivity of a retina is determined, in accordance with some embodiments.

FIG. 1 is an example diagnostic evaluation platform 100 on which at least visual field sensitivity 112 of a retina is determined, in accordance with some embodiments. The diagnostic evaluation platform 100 includes an optical coherence tomography (OCT) device 102 and one or more computer devices 104 (e.g., devices 104A and 104B). The OCT device 102 is configured to capture a plurality of cross-sectional scan images 108 of a retina including an inner retinal layer. A first computer device 104A is optionally distinct from the OCT device 102 or integrated in the OCT device 102. The first computer device 104A is configured to obtain the plurality of cross-sectional scan images 108 of the retina and generates a ROTA map 110 of the inner retinal layer from the plurality of cross-sectional scan images 108. The ROTA map 110 includes a plurality of pixels, and each pixel of the ROTA map corresponds to a respective optical texture signature value S providing information about tissue composition and optical density of the inner retinal layer at a respective retinal location. A second computer device 104B is optionally distinct from the first computer device 104A or includes the first computer device 104A. The second computer device 104B is configured to apply one or more machine learning models 120 to process the ROTA map 110 of the inner retinal layer to determine visual field sensitivity 112 of the retina, estimate a probability 114 of each of one or more eye diseases, identify a defect location 116 in the RNFL, or implement other retinal analytic tasks. A third computer device 104C is optionally distinct from the first and second computer devices 104A and 104B or includes one or more of both of the first and second computer devices 104A and 104B. The third computer device 104C is configured to report the plurality of scan images 108, the ROTA map 110, the visual field sensitivity 112 of the retina, the probability 114 of each of one or more eye diseases, the defect location 116 in the RNFL, or any other retinal analytic results to a doctor 122 or to a patient.

The diagnostic evaluation platform 100 further includes a server 106. In some embodiments, the server 106 is configured to generate the ROTA map 110 of the inner retinal layer from the plurality of cross-sectional scan images 108 and/or train and apply the one or more machine learning models 120 to process the ROTA map 110 of the inner retinal layer to implement one or more retinal analytic tasks. In some embodiments, the first computer device 104A is coupled to the OCT device 102 locally at a venue, and generates the ROTA map 110 of the inner retinal layer from the plurality of cross-sectional scan images 108 captured locally by the OCT device 102. The ROTA map 110 is uploaded to the server 106 via one or more communication networks 118. The server 106 receives the ROTA map 110 and applies the one or more machine learning models 120 to process the ROTA map 110 to determine the visual field sensitivity 112 of the retina. Alternatively, in some embodiments, the plurality of cross-sectional scan images 108 are uploaded to the server 106 by the OCT device 102. The server 106 receives the plurality of cross-sectional scan images 108, generates the ROTA map 110 from the cross-sectional scan images 108, and determines the visual field sensitivity 112 of the retina from the ROTA map using one ore more machine learning models 120. The third computer device 104C downloads the visual field sensitivity 112 of the retina from the server 106, and presents the visual field sensitivity 112 to the doctor 122 or to the patient for review.

In some embodiments, the server 106 does not include any of the computer devices 104A-104C. The first and second computer devices 104A and 104B are optionally located at the same location with the OCT device 102 or the third computer device 104C. The server 106 is configured to train the one or more machine learning models 120 using training datasets and provide the trained machine learning models 120 to the second computer device 104B, allowing the second computer device 104B to process the ROTA map 110 and implement one or more retinal analytic tasks locally.

The OCT device 102, one or more computer devices 104, and the server 106 are communicatively coupled to each other via one or more communication networks 118, which are used to provide communications links among devices connected together within the diagnostic evaluation platform 100. The one or more communication networks 118 may include connections, such as a wired network, wireless communication links, or fiber optic cables. Examples of the one or more communication networks 118 include local area networks (LAN), wide area networks (WAN) such as the Internet, or a combination thereof. The one or more communication networks 118 are implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), WiMAX, or any other suitable communication protocol. A connection to the one or more communication networks 118 may be established either directly (e.g., using 3G/4G connectivity to a wireless carrier), or through a network interface (e.g., a router, switch, gateway, hub, or an intelligent, dedicated whole-home control node), or through any combination thereof. In some embodiments, the one or more communication networks 118 allow for communication using any suitable protocols, such as Transmission Control Protocol/Internet Protocol (TCP/IP).

Figure 2:
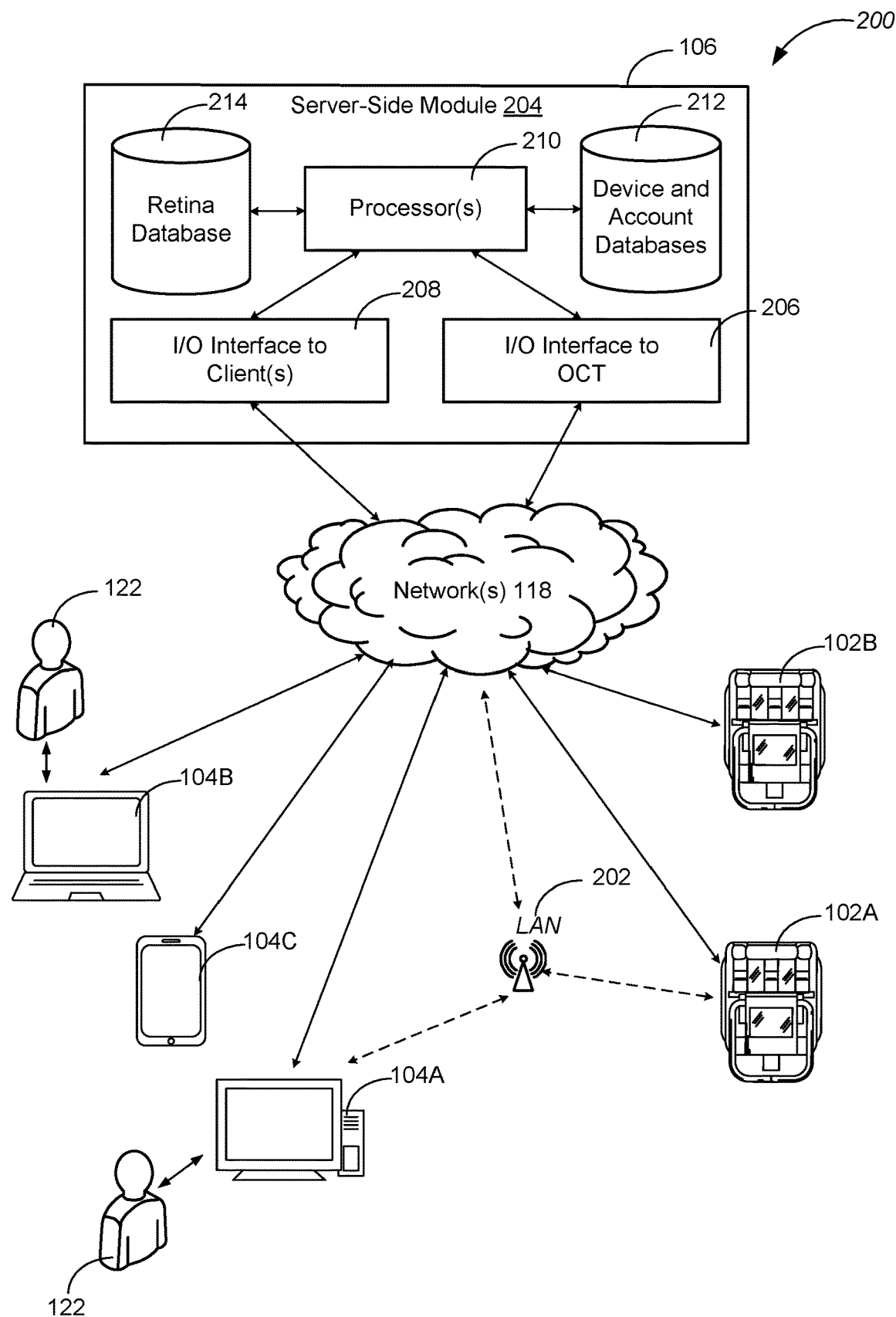
FIG. 2 is an example data environment that facilitates communication and processing of retinal data, in accordance with some embodiments.

FIG. 2 is an example data processing environment 200 that facilitates communication and processing of retinal data, in accordance with some embodiments. The data processing environment 200 includes a plurality of networked OCT devices 102 (e.g., devices 102A and 102B), a plurality of networked computer devices 104 (e.g., devices 104A, 104B, and 104C), and a server 106. The OCT devices 102, computer devices 104, and server 106 are communicatively coupled to each other via one or more communication networks 118. In an example, two or more devices (e.g., an OCT device 102A and a computer device 104A) are located in close proximity to each other, such that they can be communicatively coupled in the same sub-network via wired connections or via a LAN 202 enabled by a network interface device. Each of the OCT devices 102, computer devices 104, and server 106 is configured to execute a respective eye monitoring application for scanning a retina, analyzing eye data, or reporting retinal analytic results.

The server 106 includes a server-side module 204 configured to execute a server-side eye monitoring application for generating a ROTA map 110 of an inner retinal layer from a plurality of cross-sectional scan images 108, training one or more machine learning models 120, and/or applying the machine learning models 120 to implement one or more retinal analytic tasks (e.g., determining visual field sensitivity 112 of a retina). The server-side module 204 of the server 106 includes input/output (I/O) interfaces 206 to the OCT devices 102, I/O interfaces 208 to the computer devices 104, one or more processors 210, a device and account database 212, and an eye database 214. An I/O interface to one or more OCT devices 102 facilitates input and output processing of the plurality of scan images 108 for the server-side module 204. An I/O interface to one or more computer devices 104 facilitates input and output processing of the scan images 108, ROTA images 110, machine learning models 120, or analytic results 112-116 for the server-side module 204. The device and account database 212 stores a plurality of profiles for reviewer or patient accounts registered with the server 106. Each user profile includes account credentials for a respective reviewer or patient account. The eye database 214 stores the scan images 108, ROTA images 110, and/or analytic results 112-116, as well as various types of metadata for use in data processing for eye monitoring and diagnostic evaluation for each reviewer or patient account.

Each OCT device 102 is configured to execute an eye monitoring application to capture/acquire a plurality of scan images 108 of a retina. The OCT device 102 optionally sends the plurality of scan images 108 to a local computer device 104A or a remote server 106. In some embodiments, the computer device 104A is configured to execute an eye monitoring application to obtain the plurality of cross-sectional scan images 108 of the retina and generate a ROTA map 110 of the inner retinal layer from the plurality of cross-sectional scan images 108. In some embodiments, the computer device 104B is configured to execute an eye monitoring application to obtain the ROTA map 110 and determine visual field sensitivity 112 of a retina using the one or more machine learning models 120 provided by the server 106. In some embodiments, a computer device 104C is configured to execute an eye monitoring application to obtain the plurality of scan images 108, ROTA map 110, visual field sensitivity 112 of the retina, probability 114 of each of one or more eye diseases, defect location 116 in the RNFL, or any other retinal analytic results, and present such retinal analytic results to a doctor 122 or to a patient for review. In some embodiments, a subset of the retinal analytic results (e.g., visual field sensitivity 112) is visualized in a graphical user interface (GUI) of the computer device 104C.

Figure 3:
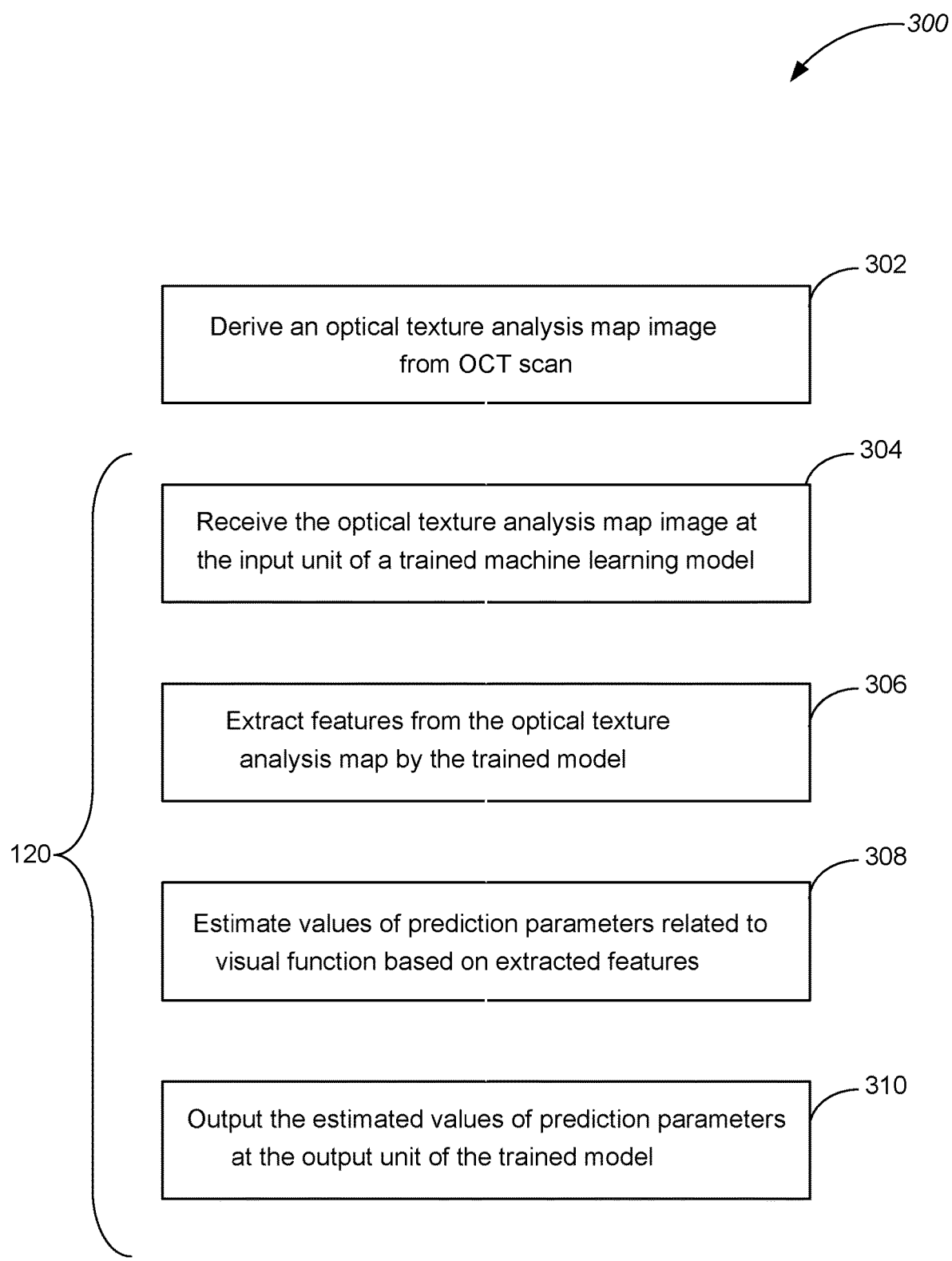
FIG. 3 is a flow chart of a computer-implemented method of evaluating the visual field of a patient's eye, in accordance with some embodiments.

FIG. 3 is a flow chart of a computer-implemented method 300 of evaluating visual field of a patient's eye, in accordance with some embodiments. The method 300 is implemented by a computer system (e.g., an OCT device 102, a first computer device 104A, a second computer device 104B, a server 106, or a combination thereof). The computer system obtains a plurality of cross-sectional scan images 108 of a retina captured/acquired by an OCT device 102. The retina has an inner retinal layer. The computer system generates (302) a ROTA map 110 of the inner retinal layer from the plurality of cross-sectional scan images 108. The ROTA map 110 includes a plurality of pixels, and each pixel of the ROTA map corresponds to a respective optical texture signature value S providing information about tissue composition and optical density of the inner retinal layer at a respective retinal location. In an example, the OCT device 102 scans a fixed portion of the retina and captures/acquires the plurality of cross-sectional scan images 108, and the ROTA map 110 corresponds to the scanned fixed portion of the retina. In another example, the OCT device 102 scans a first fixed portion of the retina and captures/acquires a first subset of the plurality of cross-sectional scan images 108. The OCT device 102 scans a second fixed portion of the retina and captures/acquires a second subset of the plurality of cross-sectional scan images 108. The ROTA map 110 includes a first portion corresponding to the scanned first fixed portion of the retina and a second portion corresponding to the scanned second fixed portion of the retina. The first portion and second portion of the ROTA map 110 are stitched together to form the ROTA map 110. In some embodiments, the ROTA map is formed by stitching together three or more portions corresponding to distinct fixed portions of the retina.

The computer system further applies a machine learning model 120 to process the ROTA map 110 of the inner retinal layer to determine visual field sensitivity 112 of the retina. In some embodiments, the machine learning model 120 includes an input unit, one or more intermediate layers, and an output unit. The computer system receives (304) the ROTA map 110 at the input unit, extracts (306) features from the ROTA map to estimate (308) values of prediction parameters related to visual function based on the extracted features by the one or more intermediate layers, and outputs (310) the estimated values of prediction parameters at the output unit. In an example, the prediction parameters include the visual field sensitivity 112 that indicates the visual function of the eye. The computer system applies the machine learning model 120 to determine the visual field sensitivity of 112 the retina.

Figure 4A:
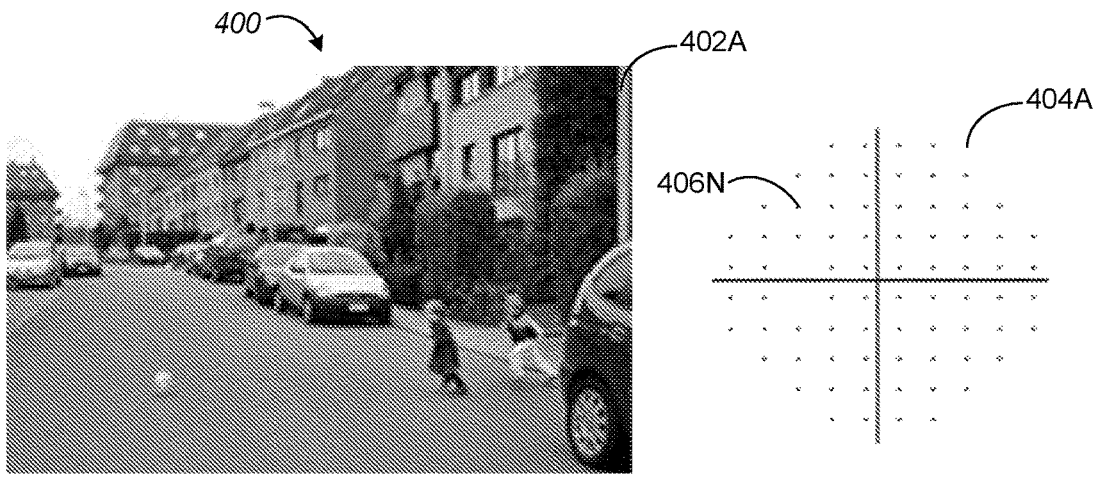
FIGS. 4A-4C provide comparisons between three images perceived by patients and visual field sensitivity maps of the patients' retinas, in accordance with some embodiments.
Figure 4B:
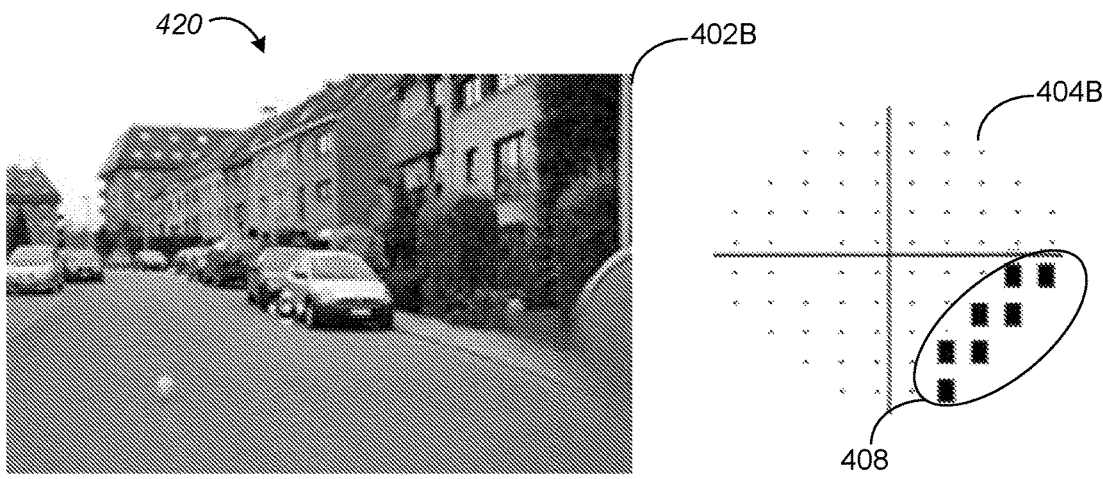
Figure 4C:
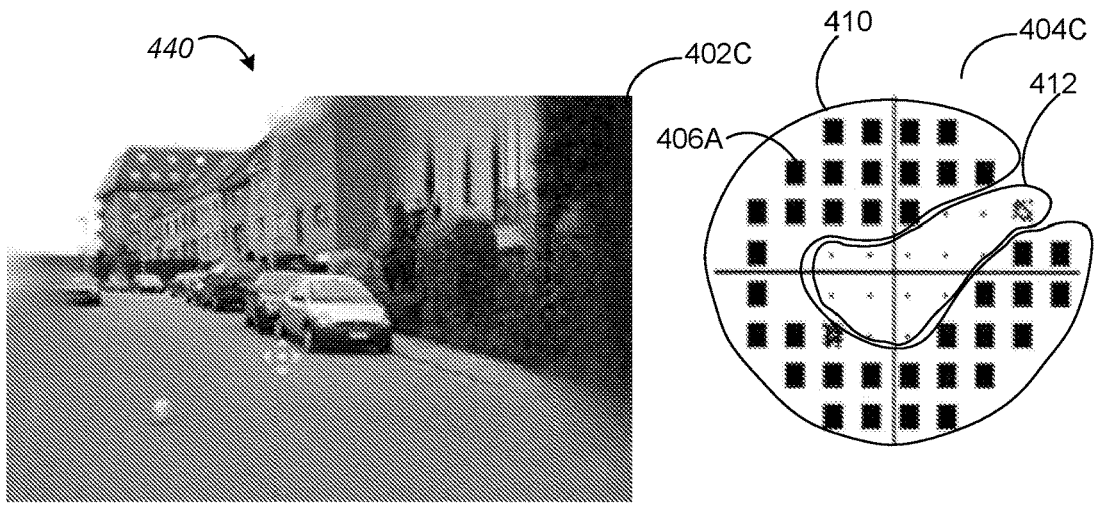

FIGS. 4A-4C illustrate three comparisons 400, 420, and 440 between views 402 (402A, 402B, and 402C) perceived by patients and visual field sensitivity maps 404 (404A, 404B, and 404C) of the patients' retinas, in accordance with some embodiments. The visual field sensitivity 112 of a retina includes one or more local visual field sensitivity values, each of which indicates the local sensitivity level of a distinct selected visual field location, one or more regional visual field sensitivity indexes, each of which indicates a regional sensitivity level of a selected region of the retina, or one or more global visual field sensitivity indexes, each indicating an overall sensitivity level of the retina. In some embodiments, a plurality of local visual field sensitivity values or a plurality of regional visual field sensitivity indexes are consolidated to form a visual field sensitivity map 404. In an example, the visual field sensitivity map 404 includes an array of 76 sensitivity values or indexes evenly distributed in four quadrants of a planar area. Each quadrant includes 19 sensitivity values or indexes that are arranged in 5 rows and 5 columns, and has decreasing row and column widths from a center of the visual field to a periphery of the visual field. Each sensitivity value or index is represented visually in a binary manner. For example, if a sensitivity or index is normal, a dot 406N is drawn at a location corresponding to the sensitivity or index, and if a sensitivity or index is not normal, a dotted or solid rectangle 406A is drawn at a location corresponding to the sensitivity or index.

Referring to FIG. 4A, a visual field sensitivity map 404A of a patient's eye indicates that the plurality of local visual field sensitivity values are normal and that a corresponding visual field of the eye is normal and not impaired. The view 402A perceived by the patient is complete, without any defects. Referring to FIG. 4B, a visual field sensitivity map 404B of a patient's eye indicates that a right bottom subset of the plurality of local visual field sensitivity values 408 are abnormal and that a right bottom portion of the visual field of the eye is impaired. The view 402B perceived by the patient is incomplete, and a portion of a car and two kids in the right bottom portion of the visual field are missing from the perceived view 402B. Referring to FIG. 4C, a visual field sensitivity map 404C of a patient's eye indicates that a large subset (about 80%) of the plurality of local visual field sensitivity values 410 are abnormal and that a corresponding large portion of the visual field of the eye is impaired. From a different perspective, only a central subset (about 20%) of the plurality of local visual field sensitivity values 412 at a central portion of the visual field of the eye are normal. The view 402C perceived by the patient is incomplete, and only the central portion of the visual field is complete. Most of a peripheral portion of the visual field is incomplete.

Figure 5A:
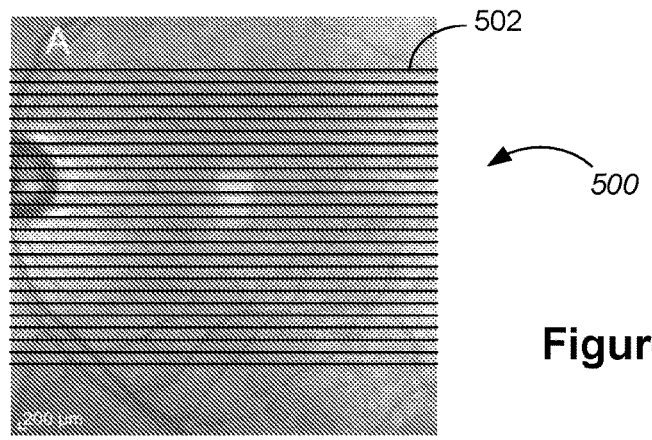
FIG. 5A is an image of a retina, in accordance with some embodiments.
Figure 5B:
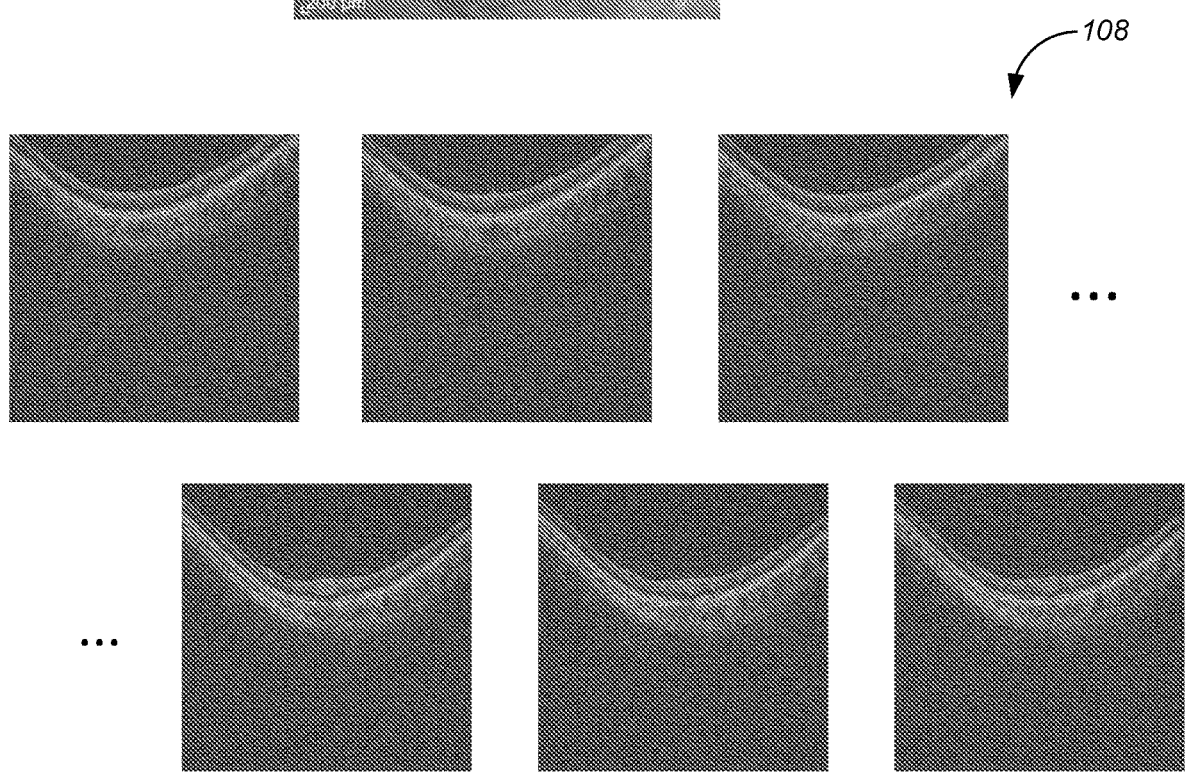
FIG. 5B is a plurality of OCT scan images, in accordance with some embodiments.
Figure 5C:
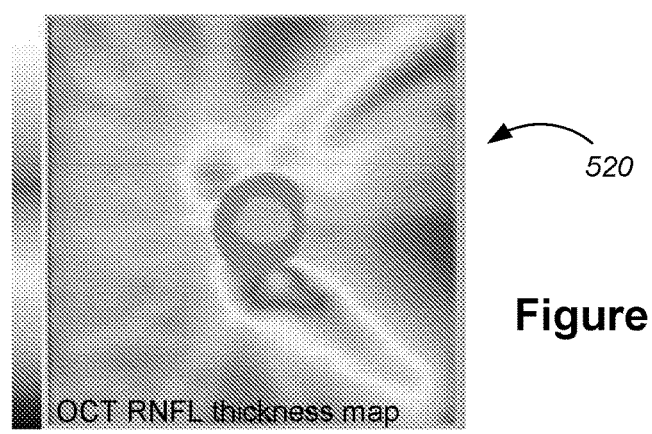
FIG. 5C is a ROTA map including an RNFL thickness map, in accordance with some embodiments.

FIG. 5A is a projection image 500 of a retina, in accordance with some embodiments, and FIG. 5B includes a plurality of OCT scan images 108, in accordance with some embodiments. FIG. 5C an RNFL thickness map 520 generated from the plurality of OCT scan images 108 in FIG. 5B, in accordance with some embodiments. The image of the retina 500 is marked with a plurality of parallel horizontal lines 502. An OCT device 102 scans along the plurality of parallel horizontal lines 502 to capture/acquire the plurality of OCT scan images 108 in FIG. 5B. A first computer device 104A identifies a plurality of boundary lines of the inner retinal layers of the retina in each of the plurality of cross-sectional scan images 108 of the retina, and for each pixel of the thickness map corresponding to the respective retinal location, determines the distance between the anterior and posterior boundaries of the inner retinal layer corresponding to the retinal location. In an example, the inner retinal layer includes a retinal nerve fiber layer (RNFL), the thickness of the RNFL is determined and mapped in FIG. 5C.

Figure 6A:
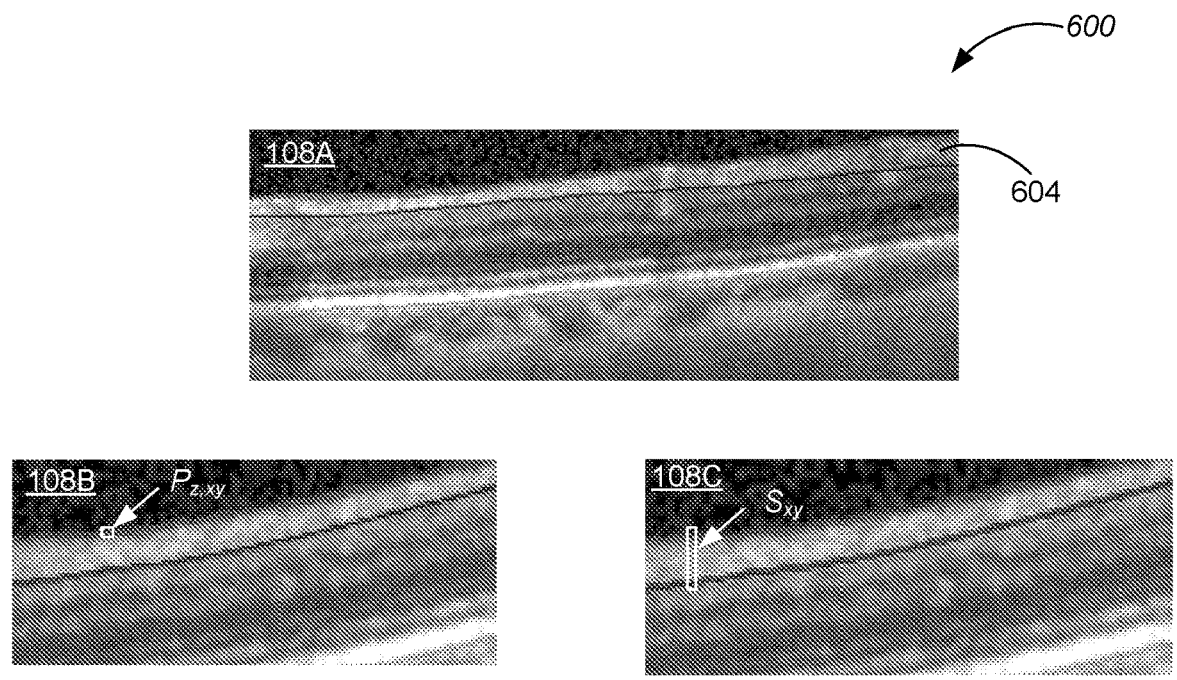
FIG. 6A provides a set of images processed from an OCT scan image, in accordance with some embodiments.
Figure 6B:
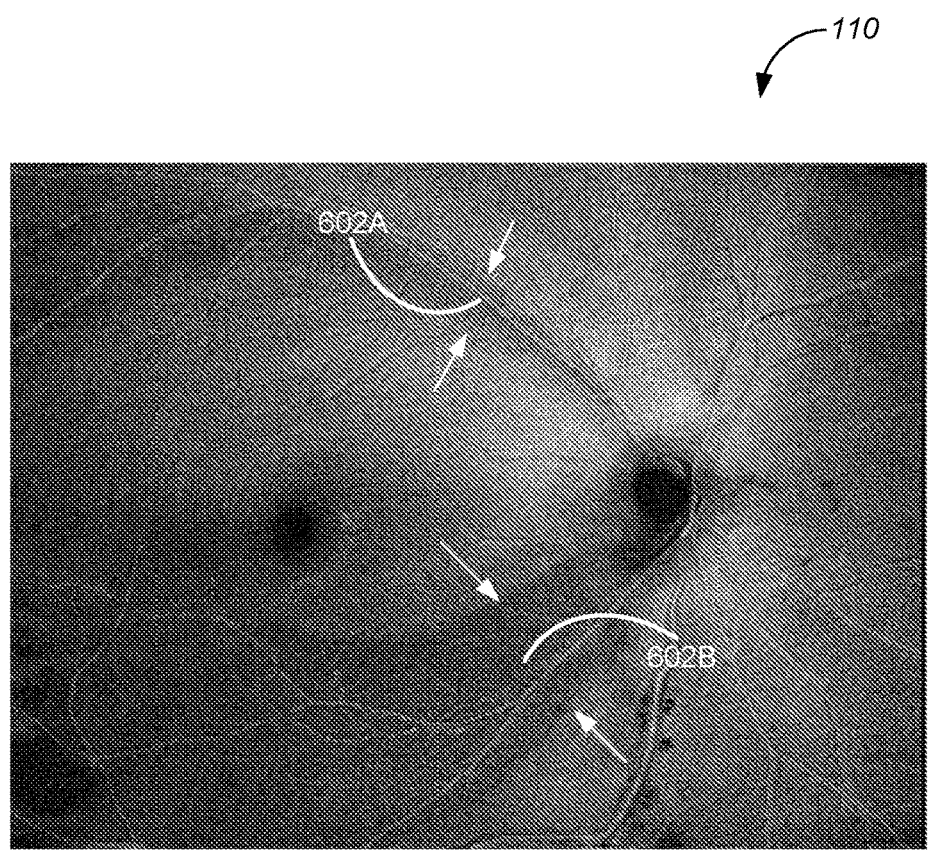
FIG. 6B is a ROTA map including RNFL abnormalities, in accordance with some embodiments.

FIG. 6A includes a set of images 600 processed from an OCT scan image 108, in accordance with some embodiments, and FIG. 6B is a ROTA map 110 including RNFL abnormalities 602 (e.g., abnormalities 602A and 602B), in accordance with some embodiments. As shown in each scan image 600, the inner retinal layer is one of: (i) a retinal nerve fiber layer (RNFL) 604, (ii) a ganglion cell layer (GCL), or (iii) an inner plexiform layer (IPL). The ROTA map 110 corresponds to one or more immediately adjacent layers of the retina, and is not limited to mapping the RNFL 604. Sometimes an inner retinal layer is one of: a combination of the RNFL and GCL, a combination of the GCL and IPL, or a combination of the RNFL, the GCL, and the IPL. Each of the RNFL 604, the GCL, and the IPL has an anterior boundary and a posterior boundary. The optical texture signature value S and the set of reflectance values P are determined from the scan images 108 and processed images 600. The ROTA map 110 in FIG. 6B corresponds to an eye with glaucoma. There are two regions of RNFL abnormalities (indicated by the arrows) 602A and 602B in the eye with glaucoma: one region 602A on the superior retina and a second region 602B on the inferior retina.

In some embodiments, the optical texture signature value S of each topographic location on a retinal tissue layer is computed by integrating (1) the OCT reflectance of the tissues between the layer boundaries and (2) the tissue thickness of the layer using a specific non-linear transformation and normalization processing according to the algorithm of optical texture analysis. More details are explained in U.S. Pat. No. 10,918,275, titled "Optical Texture Analysis of Inner Retina", which issued Feb. 16, 2021. A process of determining the ROTA map 110 includes extracting three-dimensional optical density measurements from images of the retina obtained using a digital imaging instrument, such as OCT; transforming the three-dimensional optical density measurements of a specific inner retinal layer (i.e. RNFL, GCL, IPL, or any combination of the above) at a specific retinal location (x, y) into optical texture signature values ($S_{xy}$) of that particular layer at that particular retinal location; and generating a topographic display of the computed optical texture signature values of the inner retinal layer(s).

In some embodiments, multiple cross-sectional scans of the retina in a wide field are captured. For example, conventional OCT may be used. In OCT, an "A-scan" is captured based on the time-delay of light reflected from each optical interface as a pencil of light enters the eye. Repeated A-scans across the retina can be used to reconstruct a cross-section of a plane through the retina; such a cross section is referred to as a "B-scan." It is generally desirable to capture multiple B-scans of the retina, providing cross-sections through different portions of the retina. In some embodiments, the wide field (e.g., 12×9 mm$^2$) covers the macula and the optic nerve head. Boundaries of the inner retinal layers are determined. The inner retinal layers in this example include RNFL, GCL, and IPL. In some embodiments, determination of boundaries is achieved by analyzing specific threshold transitions of the optical density in the individual A-scans. Referring to FIG. 6A, a first cross-sectional image 108A includes anterior and posterior boundaries of the RNFL 604, respectively. Optical density measurements at specific retinal locations are extracted. The optical density measurements can be extracted for multiple retinal locations within a layer of interest, such as the RNFL, based on the boundaries. In the second image 108B, a sample scan location has optical density Pz,xy, where z corresponds to the scan depth of the A-scan, x corresponds to the A-scan location, and y corresponds to the B-scan location. (The two-dimensional coordinates (x, y) correspond to a particular location on the surface of the retina, also referred to herein as a retinal location.)

An optical texture signal value ($S_{xy}$) is computed for particular retinal locations using the optical density measurements Pz,xy extracted. In some embodiments, $S_{xy}$ is computed for all available retinal locations (x, y), which may be limited based on the resolution of the scans. $S_{xy}$ can be computed separately for different inner retinal layers (e.g., RNFL, GCL, IPL) or computed for two or more inner retinal layers considered together. In the third image 108C, the optical texture signal value $S_{xy}$ can provide information about the tissue composition of a retinal layer of interest at a particular retinal location (x, y). In some embodiments, $S_{xy}$ is computed in a manner that accounts for imaging artifacts such as noise and gamma correction. For example, the optical texture signal value $S_{xy}$ of a particular retinal location (x, y) can be computed using the following equation:

$$S_{xy} = \left\{ \sum_{z=b_{1,xy}}^{b_{2,xy}} \left( \frac{P_{z,xy}}{P_{ref}} \right)^{\gamma_1} \Big/ \alpha \right\}^{\frac{1}{\gamma_2}} \quad (1)$$

where $b_{1,xy}$ and $b_{2,xy}$ correspond to the anterior and posterior boundaries, respectively, of the retinal layer of interest (e.g., the RNFL) at the retinal location (x, y); $P_{ref}$ corresponds to a reference optical density value for normalization calculated with reference to a global or local signal-to-noise ratio; $\gamma_1$ corresponds to a gamma value for application of a gamma transformation function; $\gamma_2$ corresponds to a gamma value for application of a gamma correction function; and a corresponds to a predefined constant proportional to the peak tissue thickness of the retinal layer of interest.

In this example, normalization of the optical density measurements is applied relative to a reference optical density value ($P_{ref}$) calculated with the overall (global) signal-to-noise ratio or local signal-to-noise ratios of individual B-scans before computation of the optical texture signature values. Various references can be used. For example, $P_{ref}$ can be the mean, median, or maximum optical density value of any of: (a) the outer nuclear layer; (b) the inner segment and outer segment junction; (c) the retinal pigment epithelium; (d) the choroidal layer; or (e) a combination of some or all of (a)-(d).

A nonlinear transformation, in this case a gamma transformation ($p^\gamma$), may be applied to the normalized optical density measurements of a specific retinal location prior to summation, and a further non-linear transformation such as the gamma correction ($p^{1/\gamma}$) may be applied to the computed summation of the normalized, gamma transformed optical density measurements.

Those skilled in the art will appreciate that different definitions of $S_{xy}$ may be used. For instance, in equation (1), the individual optical density measurements $P_{z,xy}$ are normalized and gamma-transformed prior to summing over depths z. In other embodiments, normalization and/or gamma transformation can be applied after summing. Further, other non-linear transformations can be applied in addition to or instead of gamma transformation and/or gamma correction, including power functions, exponential functions, or logarithmic functions.

The ROTA map 110 in FIG. 6B is generated for display. As used herein, a displayable ROTA map 110 can include any representation of $S_{xy}$ for a particular retinal layer of interest as a function of retinal location (x, y). Examples include: color (or grayscale) maps where the color (or intensity) at a particular coordinate represents $S_{xy}$, three-dimensional rendering (e.g., topographic maps), and so on. FIG. 6B shows an example of a grayscale optical texture analysis map that can be generated according to some embodiments of the present invention. The displayable texture analysis map may be presented to a user (e.g., an ophthalmologist or other medical professional) in various ways. For example, an optical texture analysis map can be displayed on a computer monitor or other display device, and/or printed onto paper or other media. In some embodiments, the data underlying or representing the displayable optical texture analysis map can be stored as a computer-readable file, which can be retrieved for subsequent transmission and/or display and/or transmission.

In some embodiments, the ROTA map 110 can be used to diagnose disorders affecting the retina. For example, optical texture signatures from normal RNFL/GCL/IPL exhibit specific patterns, including higher $S_{xy}$ values over the inferotemporal and superotemporal sectors of the optic nerve head and the papillomacular bundles (i.e., superotemporal and inferotemporal sectors of the macula) compared with the nasal retina. RNFL/GCL/IPL abnormalities can therefore be identified based on deviation from these specific patterns. For example, the ROTA map 110 in FIG. 6B demonstrates two inferotemporal RNFL defects 602A and 602B.

In some embodiments, diagnosis based on optical texture analysis maps can be partially or fully automated (e.g., using machine learning techniques). For example, a training data set can be generated by performing perimetry tests for a large number of eyes that are known to be healthy or abnormal (e.g., glaucomatous with varying degrees of RNFL/GCL/IPL damage). The optical texture analysis maps generated and the known condition of the eyes can be provided as inputs to a training phase of a machine learning algorithm (e.g., a deep neural network or other deep learning algorithm), and conventional techniques can be used to train the algorithm to identify patterns associated with a particular condition. In some embodiments, the output can be a probabilistic assessment indicating the likelihood that a particular abnormal condition is or is not present. In some embodiments, a single machine learning algorithm can be trained to recognize multiple different abnormal conditions (as well as healthy eyes) and assign probabilities to each.

In some embodiments, progressive generalized and localized changes in retinal layers can be monitored. This can be achieved, for example, by repeating the process of generating the ROTA map 110 for the same patient at intervals across a period of time, longitudinally normalizing the optical texture signature values from different scans, and performing event-based or trend-based analysis on the normalized results.

Figure 7A:
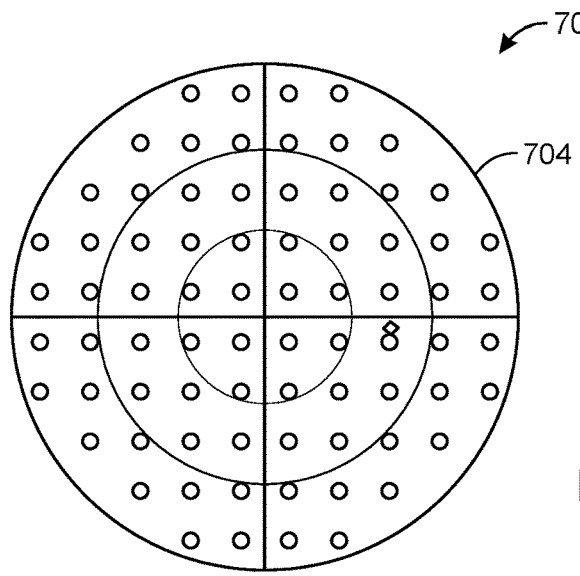
FIGS. 7A-7C are three visual field sensitivity maps in three predefined perimetry tests (also called visual field tests), in accordance with some embodiments.
Figure 7B:
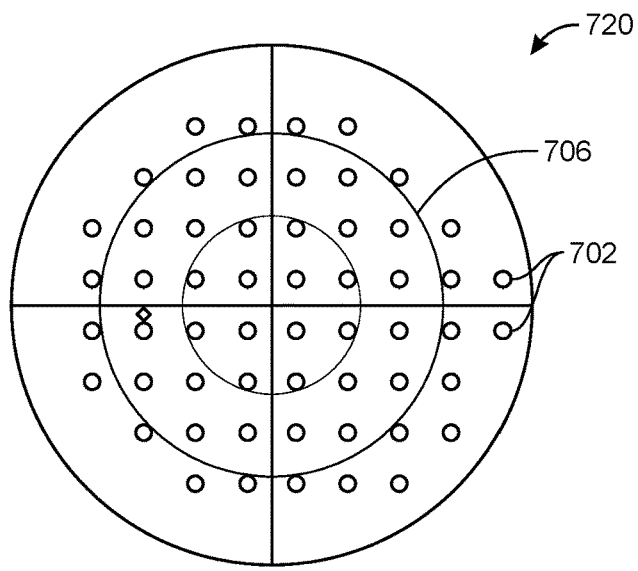
Figure 7C:
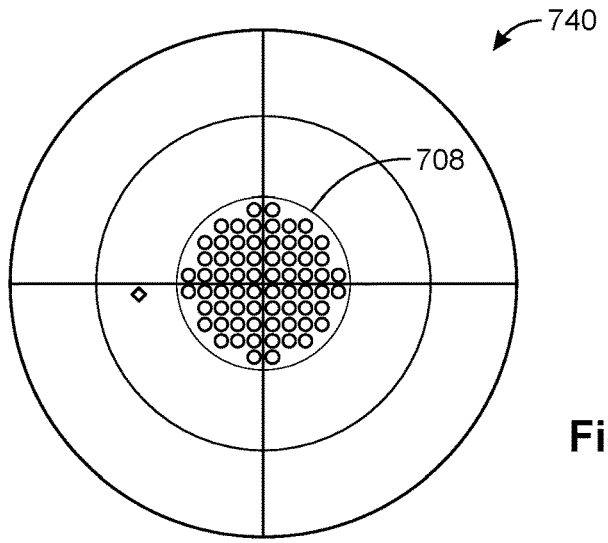

FIGS. 7A-7C are three visual field sensitivity maps 700, 720, and 740 in three predefined perimetry test patterns (also called visual field test patterns), in accordance with some embodiments. As explained above, visual field sensitivity 112 of a retina includes one or more local visual field sensitivity values, each of which indicates a local sensitivity level of a distinct selected visual field location, one or more regional visual field sensitivity indexes, each of which indicates a regional sensitivity level of a selected region of the retina, or one or more global visual field sensitivity indexes, each indicating an overall sensitivity level of the retina. In some embodiments, a plurality of local visual field sensitivity values or a plurality of regional visual field sensitivity indexes are consolidated to form a visual field sensitivity map 700, 720, or 740. In some embodiments, each visual field sensitivity map 700, 720, or 740 includes a number of visual field sensitivity values or indexes that have a distribution on a planar area of a visual field in accordance with a selected one of a plurality of visual field test patterns. The number of local visual field sensitivity values or indexes corresponds to the same number of visual field locations or indexes.

Referring to FIG. 7A, a first predefined perimetry test pattern applies a 30-2 testing strategy and has 76 visual field sensitivity values or indexes corresponding to 76 visual field locations or regions. The 76 visual field locations or regions are distributed evenly and symmetrically in four quadrants of the planar area of the visual field. Each quadrant includes 19 sensitivity values or indexes that are arranged in 5 rows and 5 columns, and has decreasing row and column widths from the center of the visual field to the periphery of the visual field (e.g., the rows or columns have 5, 5, 4, 3, and 2 visual field locations as each row or column is further away from the center of the visual field). Each of the visual field sensitivity maps 404A-404C in FIGS. 4A-4C is determined from a respective first predefined perimetry test pattern.

Referring to FIG. 7B, a second predefined perimetry test pattern applies a 24-2 testing strategy and has 54 visual field sensitivity values or indexes corresponding to 54 visual field locations or regions. Except for 2 visual field locations 702, the remaining 52 visual field locations or regions are distributed evenly and symmetrically in four quadrants of the planar area of the visual field. Each quadrant includes 13 sensitivity values or indexes that are arranged in 4 rows and 4 columns of the remaining visual field locations, and has decreasing row and column widths from the center of the visual field to the periphery of the visual field (e.g., the rows or columns have 4, 4, 3, and 2 visual field locations as each row or column is further away from the center of the retina). The 2 visual field locations 702 are located at the nasal end of the visual field, such that the two rows closest to the center of the visual field have 5 visual field locations in the first and fourth quadrants.

Referring to FIG. 7C, a third predefined perimetry test pattern applies a 10-2 testing strategy and has 68 visual field sensitivity values or indexes corresponding to 68 visual field locations or regions. The 68 visual field locations or regions are distributed evenly and symmetrically in four quadrants of the central portion of the planar area of the visual field. Each quadrant includes 17 sensitivity values or indexes that are arranged in 5 rows and 5 columns of the remaining visual field locations, and has decreasing row and column widths from the center of the visual field to the periphery of the visual field (e.g., the rows or columns have 5, 4, 4, 3, and 1 visual field locations as each row or column is further away from the center of the visual field).

The first predefined perimetry test covers a first area defined by a first circle 704, and the second predefined perimetry test covers a second area defined by a second circle 706. The second area is smaller than the first area. The density of the visual field sensitivity locations in the second predefined perimetry test may be equal to or different from that of the first predefined perimetry test. The third predefined perimetry test covers a third area that is defined by a third circle 708, which is smaller than the second area. The density of the visual field sensitivity locations in the third predefined perimetry test is typically greater than from those of the first and second predefined perimetry tests in the third area.

Figure 8A:
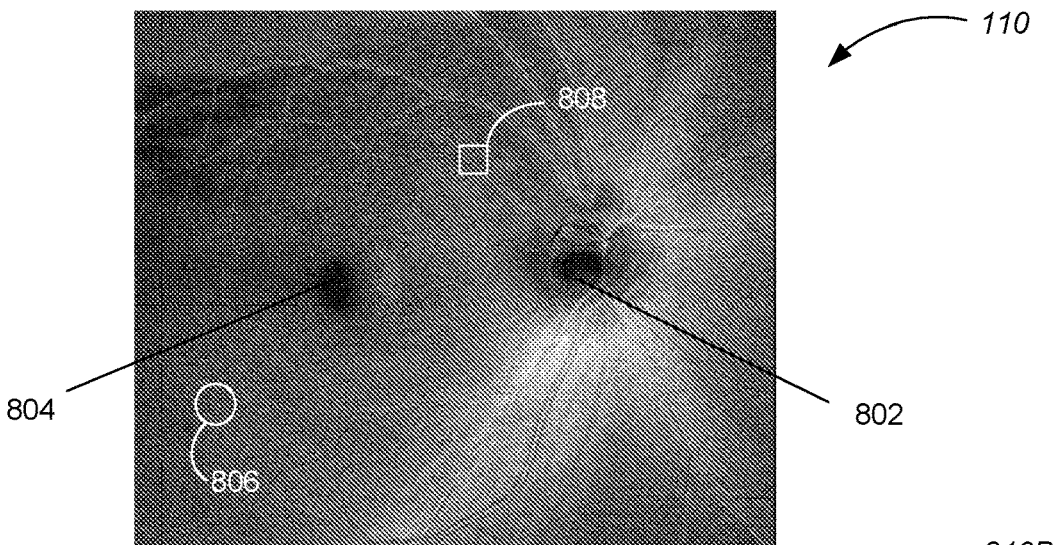
FIG. 8A is an example ROTA map of a retina including an optic disc and a fovea, in accordance with some embodiments.
Figure 8B:
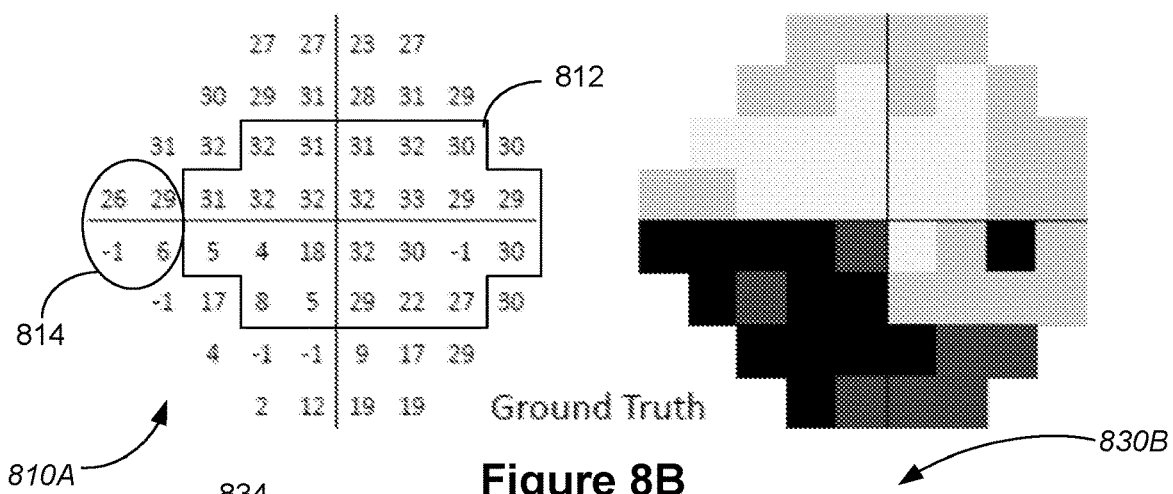
FIG. 8B illustrates ground truth visual field sensitivity represented as a numeric visual field sensitivity map and a symbolic visual field sensitivity map, in accordance with some embodiments.
Figure 8C:
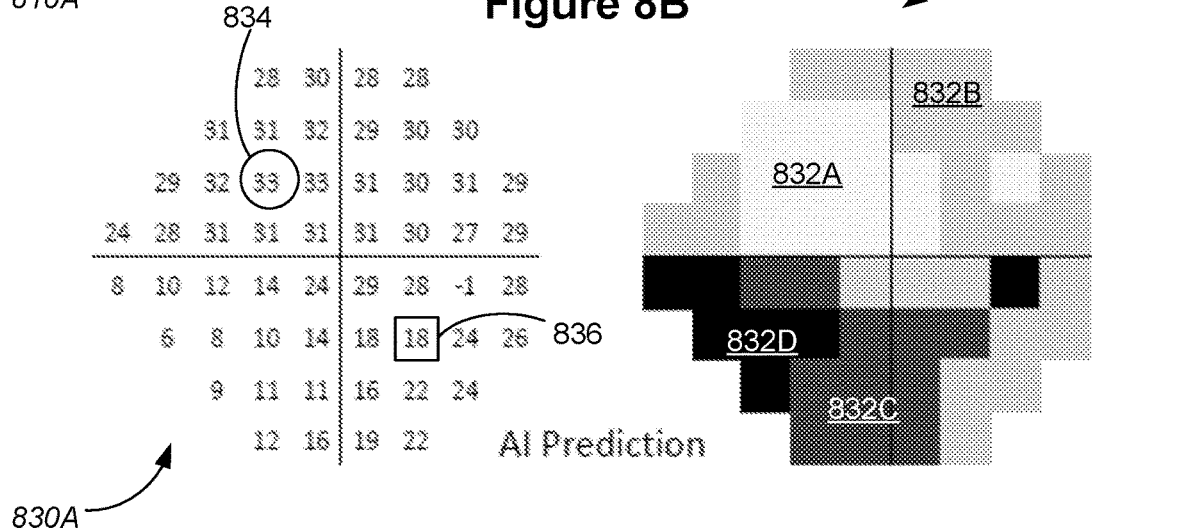
FIG. 8C illustrates predicted visual field sensitivity represented as a numeric visual field sensitivity map and a symbolic visual field sensitivity map, in accordance with some embodiments.

FIG. 8A shows an example ROTA map 110 of a retina including the optic disc 802 and the fovea 804, in accordance with some embodiments. FIG. 8B illustrates ground truth visual field sensitivity represented as a numeric visual field sensitivity map 810A and a symbolic visual field sensitivity map 810B, in accordance with some embodiments. FIG. 8C illustrates predicted visual field sensitivity represented as a numeric visual field sensitivity map 830A and a symbolic visual field sensitivity map 830B, in accordance with some embodiments. In an example, the ROTA map 110 corresponds to a portion of a retina having a size of 12 mm×9 mm, and is generated from a plurality of scan images 108 captured by an OCT device 102. A machine learning model 120 is trained based on a dataset of training ROTA map and corresponding ground truth visual field sensitivity. The training ROTA maps of the dataset are obtained based on OCT scan images 108 collected from eyes of the same patient over multiple follow-up visits during an extended period of time, eyes of different patients, healthy eyes, and/or unhealthy eyes. Each training ROTA map is paired with the respective ground truth visual field sensitivity. In some embodiments, the ground truth visual field sensitivity is measured by automated perimetry monitored by an optometrist. In some embodiments, the corresponding numeric visual field sensitivity map 810A of the ground-truth visual field sensitivity has a first region 812 and a second region 814. The first region 812 includes a first set of visual field locations corresponding to retinal locations scanned by the OCT device 102 and covered by the ROTA map. The second region 814 is external to the first region 812, and includes a second set of visual field locations that are neither scanned by the OCT device 102 nor covered by the ROTA map.

After the machine learning model 120 is trained, it is applied to process the ROTA map 110 of the inner retinal layer to determine visual field sensitivity 112 of the retina. In some embodiments, the visual field sensitivity 112 of the retina includes a plurality of visual field sensitivity values corresponding to a plurality of visual field locations. The visual field sensitivity 112 is visualized according to the plurality of visual field locations (e.g., on a graphical user interface). In some embodiments, the visual field sensitivity 112 is visualized using the numerical visual field sensitivity map 830A, organizing the plurality of visual field sensitivity values according to the corresponding visual field locations. Each visual field sensitivity value is represented in decibel (dB). Alternatively, in some embodiments, the visual field sensitivity 112 is visualized using the symbolic visual field sensitivity map 830B. Each of a plurality of visual field sensitivity values is associated with a respective one of a limited number of symbols or a limited number of grayscale levels. The symbolic visual field sensitivity map 830B visualizes the plurality of visual field sensitivity values according to a limited number of grayscale levels, and arranges the resulting grayscale levels according to the corresponding visual field locations.

For example, the symbolic visual field sensitivity map 830B includes four deficit probability levels represented by four grayscale levels 832A-832D. As the grayscale levels 832A, 832B, 832C, and 832D increase, the corresponding deficit probability levels increase. In some embodiments, the four discrete deficit probability levels correspond to three deficit thresholds (e.g., 30 dB, 24 dB, and 10 dB) that define four corresponding sensitivity ranges (e.g., greater than 30 dB, between 24 and 30 dB, between 10 and 24 dB, and less than 10 dB). In some embodiments, each of the visual field locations has its distinct deficit thresholds. The plurality of visual field sensitivity values are classified onto four categories according to the four sensitivity ranges, and the visual field locations corresponding to the classified visual field sensitivity values are represented in four grayscale levels 832A-832D.

Alternatively, in some embodiments not shown, the plurality of visual field sensitivity values in the numeric visual field sensitivity map 830A are converted to a plurality of sensitivity deviation values in dB based on patient ages. The plurality of sensitivity deviation values are therefore corrected by age, and represented in a numeric or symbolic sensitivity deviation map using a number of symbols or grayscale levels.

A visual field location is different from a retinal location. For example, if a stimulus occurs at 9 degrees to the left of the center of the visual field of different patients, it is projected onto different retinal locations in different eyes depending on individual eye geometry. A ground truth visual field sensitivity value in FIG. 8B corresponding to the stimulus is measured from a first visual field location that could be located external to the first region 812 (i.e., the scanned portion of the retina). Two visual field sensitivity locations 834 and 836 in FIG. 8C correspond to two retinal locations 806 and 808 in FIG. 8A. In some embodiments, the relative position of the locations 834 and 836 is inconsistent with the relative position of the locations 806 and 808 in different eyes.

In some embodiments, the machine learning model 120 is applied to estimate visual field sensitivity values for a plurality of visual field locations, and each visual field location is automatically represented with two respective axis values in a coordinate system. The estimated visual field sensitivity values are displayed in a graphical format according to the assigned axis values (e.g., visualized based on the corresponding visual field locations). This provides an intuitive representation to identify which part of the patient's vision is affected. Further, in some embodiments, the machine learning model 120 is applied to estimate performance indexes (e.g., one or more global visual field sensitivity indexes) of the visual field. An analysis report is generated to present the performance parameters optionally with graphical visualization.

In some embodiments, the visual field sensitivity 112 of the retina includes one or more local visual field sensitivity values corresponding to one or more visual field locations. The computer system sets a starting brightness level of a stimulus (e.g., a light stimulus) to be projected at each of the corresponding visual field locations of an eye in a subsequent perimetry test based on a respective subset of the one or more local visual field sensitivity values determined by the machine learning model. For example, each estimated visual sensitivity value for one visual field location is used as a reference to set the starting light level of stimulus to test a corresponding visual field location in visual field perimetry. The starting light level of the stimulus to be projected at one visual field location is substantially close to the sensitivity threshold of the location measured in perimetry, thereby shortening the required duration of the perimetry test.

In some embodiments, the machine learning model 120 is applied to generate a set of visual field sensitivity values at a plurality of locations of the visual field of an eye. Each visual field sensitivity value corresponds to a specific location on the retina. The machine learning model 120 provides an objective approach to quantify the visual field sensitivity 112 of an eye without performing a visual field test (e.g., a perimetry test), which requires patient's subjective response. By these means, the machine learning model 120 provides an objective approach to evaluate the visual field sensitivity 112 of the retina.

In some embodiments, the visual field locations of visual field sensitivity values are located in the first region 812 that is scanned by the OCT device 102 to form the ROTA 110. Alternatively, in some embodiments, the machine learning model is applied to estimate visual field sensitivities at visual field locations that are located within the first region and/or the second region 814 (i.e., outside the first region 812 that is scanned by the OCT device 102 to form the ROTA map 110).

In some embodiments, during training, the machine learning model 120 automatically matches the visual field sensitivity value to a visual field location or a retinal location even if the location information is not specified in the dataset used for training. The trained machine learning model 120 is applied to predict the visual field sensitivity values at corresponding automatically matched visual field locations or regions based on the ROTA map 110. In some embodiments, during training, the machine learning model 120 further receives information identifying one or more distinct visual field locations corresponding to the visual field sensitivity of the eye. The machine learning model 120 is trained using a training dataset including a plurality of data pairs of ROTA maps and one or more visual field sensitivity values corresponding to one or more first visual field locations. In some embodiments, the trained machine learning model 120 is applied to predict one or more visual field sensitivity values at the one or more first visual field locations. Alternatively, in some embodiments, the trained machine learning model 120 is applied to predict one or more visual field sensitivity values at one or more second visual field locations distinct from the first one or more visual field locations.

In some embodiments, the machine learning model 120 is trained using a set of first visual field sensitivity values corresponding to a set of first visual field locations defined by a first perimetry test pattern. During data inference, a set of target visual field sensitivity values is determined by the machine learning model and combined to map the visual field sensitivity 112. The set of target visual field sensitivity values correspond to a set of target visual field locations defined by a second perimetry test pattern. In some embodiments, the second perimetry test pattern is the same as the first perimetry test pattern. In some embodiments, the second perimetry test pattern (e.g. 10-2) is different from the first perimetry test pattern (e.g. 24-2). Further, in some embodiments, a subset of target visual field locations of the second perimetry test pattern is the same as a corresponding subset of visual field location of the first perimetry test pattern.

Figure 9:
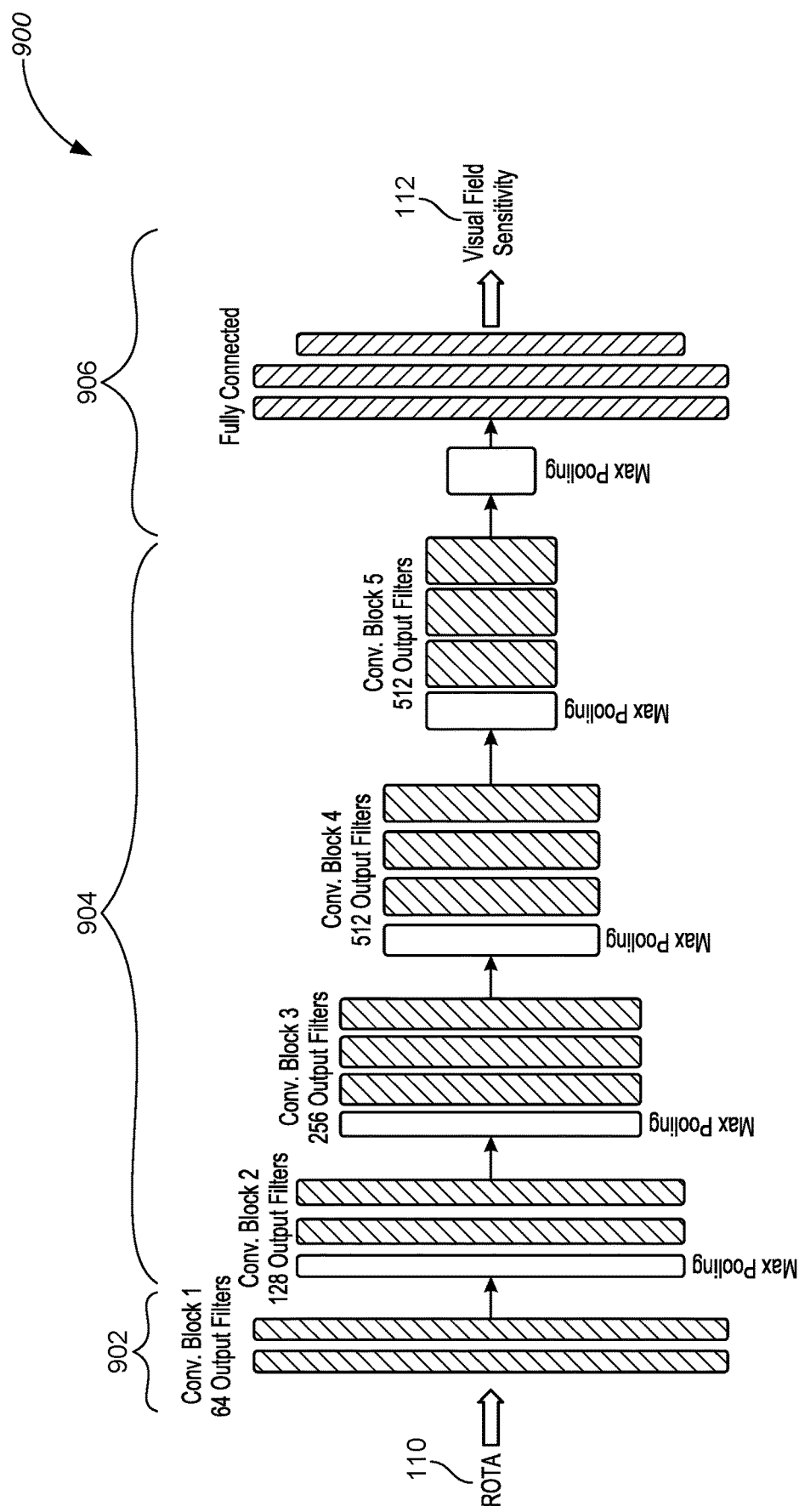
FIG. 9 is an example CNN-based machine learning model applied to determine visual field sensitivity of a retina based on a ROTA map, in accordance with some embodiments.

In some embodiments, the machine learning model 120 is a deep neural network (DNN) model which includes one or more of: (1) a convolutional neural network (CNN) including one or more convolutional blocks; (2) a vision transformer (ViT) neural network including one or more self-attention blocks; and (3) a multi-layered perceptron (MLP) neural network including one or more multi-layer perceptron blocks. FIG. 9 is an example CNN-based machine learning model 900 applied to determine visual field sensitivity 112 of a retina based on a ROTA map 110, in accordance with some embodiments. The machine learning model 120 includes a convolutional neural network (CNN) 900 having a plurality of intermediate layers of artificial neurons. Weights of network nodes of the CNN 900 are determined based on a training dataset before the CNN 900 is applied to predict the visual field sensitivity 112 from the ROTA map 110. The CNN 900 is configured to receive at least a portion of the ROTA map 110 of an inner retinal layer and output the visual field sensitivity 112. Specifically, the CNN 900 further includes an input unit 902, a series of convolutional blocks 904 coupled to the input unit 902, and one or more fully connected layers 906 coupled to the series of convolutional blocks 904. The input unit 902 is configured to receive at least a portion of the ROTA map 110 of the inner retinal layer. Each convolutional block 904 includes one or more serial convolutional layers configured to process feature maps derived from the ROTA map 110. The one or more fully connected layers 906 are configured to generate the visual field sensitivity 112 from the feature maps (also called features) derived from the ROTA map 110. Examples of the CNN 900 include, but are not limited to, ResNet, InceptionNet, DenseNet, EfficientNet, VGG, and their variants. In some embodiments, each convolutional block 904 has a pooling layer. Alternatively, in some embodiments, each convolution block 904 selectively has a pooling layer.

In some embodiments, the visual field sensitivity 112 of the retina includes one or more of: one or more local visual field sensitivity values, each of which corresponds to a local sensitivity level of a distinct selected visual field location, one or more regional visual field sensitivity indexes indicating a regional sensitivity level of a selected region of the retina, and one or more global visual field sensitivity indexes indicating an overall sensitivity level of the retina. Examples of global sensitivity indexes include a visual field index (VF), a mean deviation (MD), and a pattern standard deviation (PSD). The VF, MD, and PSD are commonly seen on an automated perimetry report. In some embodiments, the global sensitivity index is determined based on a scanned portion of a retina, an external portion distinct from the scanned portion, or a combination thereof.

In some embodiments, the machine learning model 120 is configured to extract features (e.g., a specific set of discriminative patterns) from the ROTA map 110 automatically. The features are associated with a target visual field location to be estimated and processed to determine a target visual field sensitivity value corresponding to the target visual field location. Further, in some embodiments, a subset of the features extracted by the machine learning model 120 forms a map, including weights assigned for each optical texture signature value S on the ROTA map 110. The weights are not fixed for particular pixels or areas for different ROTA maps 110. Rather, the weights are automatically adjusted according to the ROTA map 110. For each ROTA map 110, a respective set of locations on the ROTA map 110 are identified with higher weights by the machine learning model 120, indicating that one or more corresponding regions of the respective ROTA map 110 are more important to estimate the target visual sensitivity value of the target visual field location. In some embodiments, a set of optical texture signature values S assigned with higher weights are located along superior and inferior arcuate RNFL bundles, papillomacular bundles, papillofoveal bundles, or axonal fibers at a temporal macula of the retina. More details on visualizing a trajectory of features or nerve fibers are explained below with reference to FIGS. 17A, 17B, and 18.

Figure 10A:
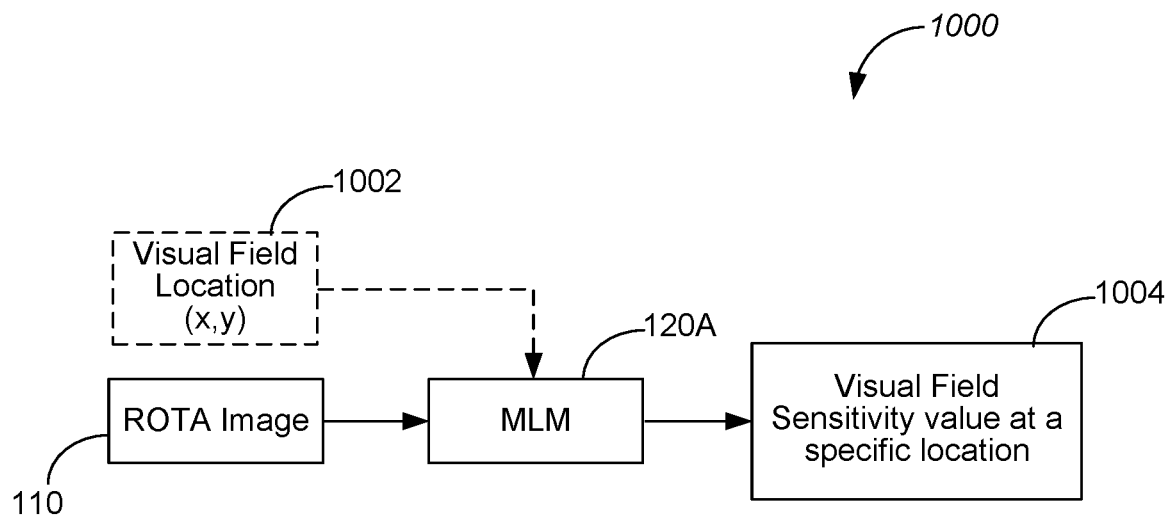
FIGS. 10A-10C are block diagrams of example data processing systems 1000, 1020 and 1040 that apply machine learning models, in accordance with some embodiments.
Figure 10B:
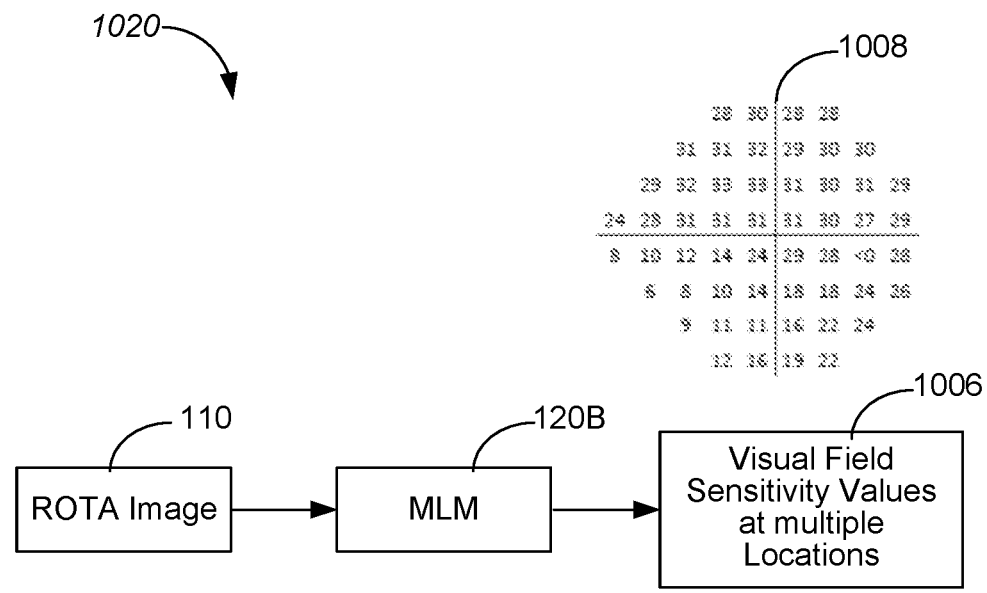
Figure 10C:
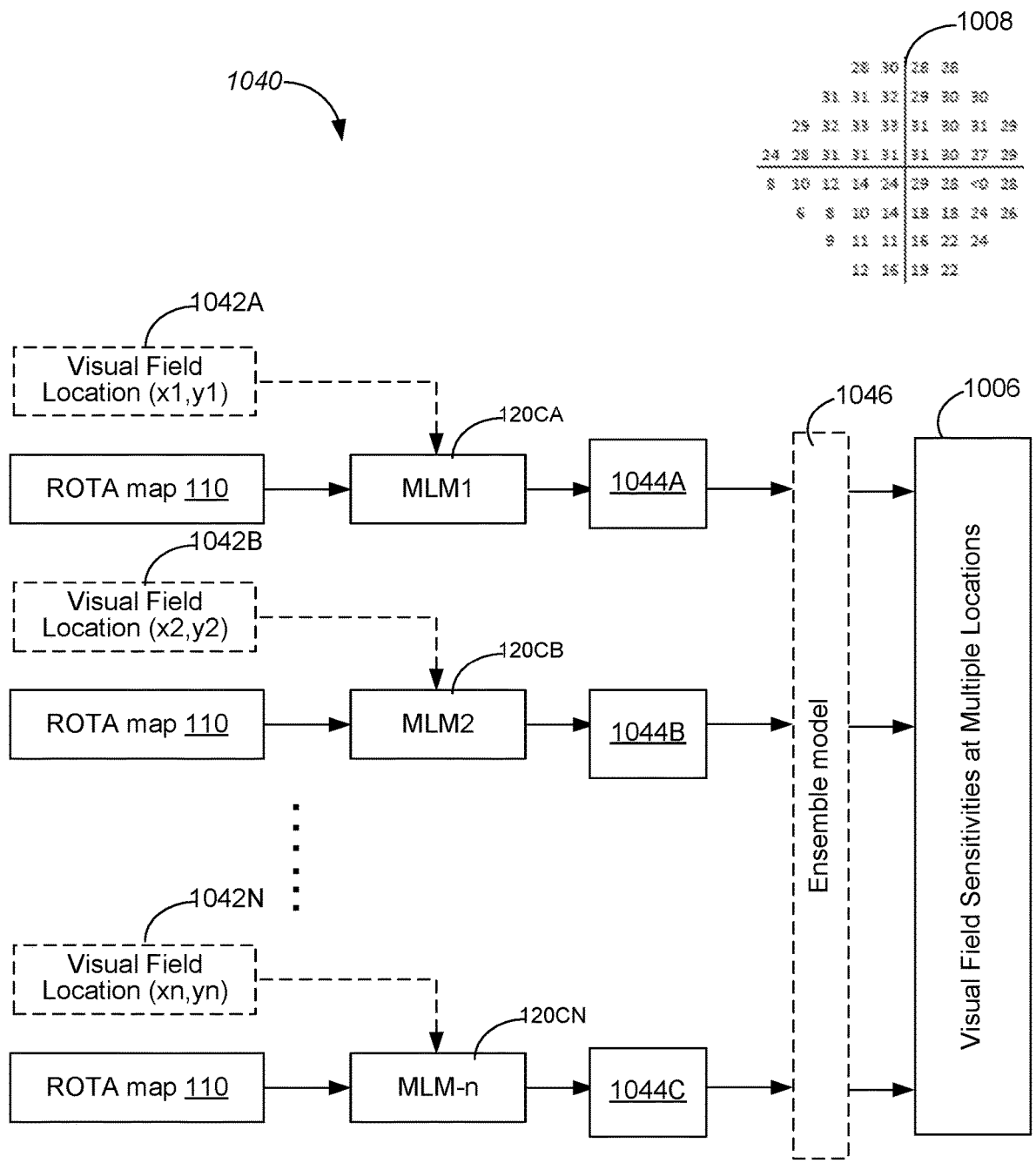

FIGS. 10A-10C are block diagrams of example data processing systems 1000, 1020, and 1040, which apply machine learning models 120, in accordance with some embodiments. Each machine learning model 120 is applied to determine respective visual field sensitivity 112 of an eye based on a ROTA map 110. Referring to FIG. 10A, in some embodiments, the machine learning model 120A is configured to receive information identifying one or more distinct visual field locations 1002 corresponding to the visual field sensitivity 112 of the eye, and train the machine learning model 120A to predict one or more local visual field sensitivity values 1004 at the one or more visual field locations 1002. Referring to FIG. 10B, in some embodiments, a set of machine learning models 120B is applied to predict a plurality of visual field sensitivity values 1006 at a plurality of visual field locations of the visual field based on the ROTA map 110. The plurality of visual field sensitivity values 1006 are outputted by an output layer (e.g., a fully connected layer) of the machine learning model 120B, and combined to generate a visual field sensitivity map 1008. In some embodiments, a distribution of the plurality of visual field sensitivity values 1006 on the visual field sensitivity map 1008 follows one of the three predefined perimetry tests in FIGS. 7A-7C.

Referring to FIG. 10C, in some embodiments, the machine learning model 120C includes a plurality of parallel heads 120CA, 120CB, . . . , 120CN. Each head is configured to receive information identifying one or more respective distinct visual field locations 1042 (e.g., locations 1042A, 1042B, . . . , 1042N) and the ROTA map 110, and determine one or more respective local visual field sensitivity values 1044 (e.g., 1044A, 1044B, . . . , 1044N) at the one or more respective visual field locations 1042. In particular, each head is trained and optimized to determine the one or more respective local visual field sensitivity values 1044 at the one or more respective visual field locations 1042. The one or more respective local visual field sensitivity values 1044 outputted by the plurality of parallel heads 120C form a collection of visual field sensitivity values 1006 that are optionally displayed on a visual field sensitivity map 1008. In some embodiments, the one or more respective local visual field sensitivity values 1044 are outputted by an output layer of the machine learning model 120C. Alternatively, in some embodiments, the machine learning model 120C further includes an ensemble model 1046 coupled to the plurality of parallel heads 120CA-120CN and configured to combine the one or more respective local visual field sensitivity values 1044.

Figure 11A:
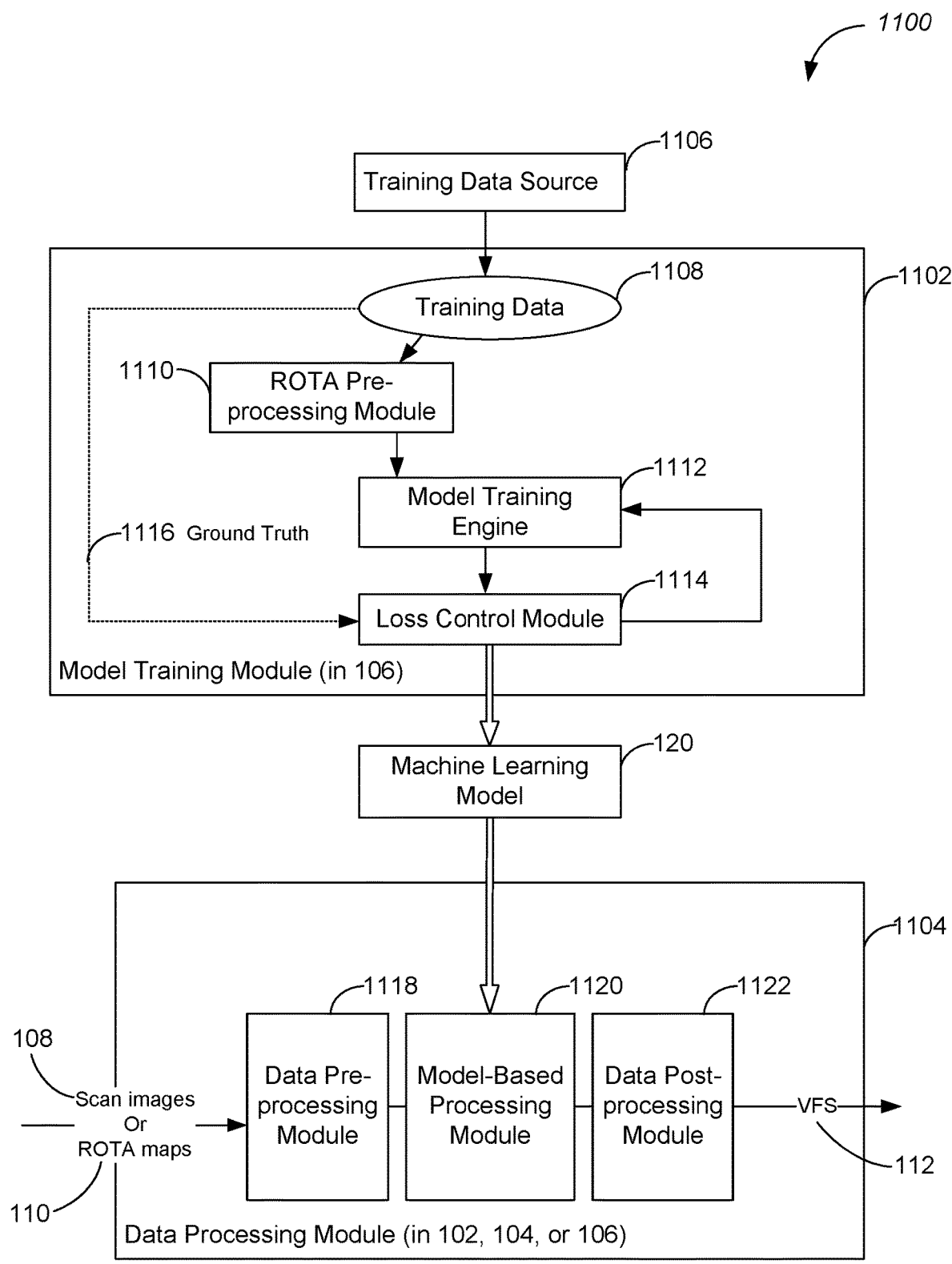
FIG. 11A is an example computer system for training and applying a machine learning model for processing scan images or a ROTA map, in accordance with some embodiments.

FIG. 11A is an example computer system 1100 for training and applying a machining learning model 120 for processing scan images 108 or a ROTA map 110, in accordance with some embodiments. The computer system 1100 includes a model training module 1102 for establishing the machine learning model 120 and a data processing module 1104 for processing the ROTA map 110 using the machine learning model 120. The model training module 1102 includes one or more ROTA pre-processing modules 1110, a model training engine 1112, and a loss control module 1114. In some embodiments, the ROTA pre-processing modules 1110 are applied to process the training data 1108. The model training engine 1112 receives pre-processed training data 1108 provided by the ROTA pre-processing modules 1110, further processes the pre-processed training data 1108 using an existing machine learning model 120, and generates an output from each training data item. During this course, the loss control module 1114 can monitor a loss function comparing the output associated with the respective training data item and a ground truth visual field sensitivity 1116 of the respective training data item. The model training engine 1112 modifies the machine learning model 120 to reduce the loss function, until the loss function satisfies a loss criteria (e.g., a comparison result of the loss function is minimized or reduced below a loss threshold). The modified machine learning model 120 is provided to the data processing module 1104 to process the content data.

In some embodiments, the model training module 1102 offers supervised learning in which the training data is entirely labelled and includes a desired output for each training data item (also called the ground truth in some situations). Conversely, in some embodiments, the model training module 1102 offers unsupervised learning in which the training data 1108 is not labelled. The model training module 1102 is configured to identify previously undetected patterns in the training data 1108 without pre-existing labels and with no or little human supervision. Additionally, in some embodiments, the model training module 1102 offers partially supervised learning in which the training data is partially labelled.

The data processing module 1104 includes a data pre-processing module 1118, a model-based processing module 1120, and a data post-processing module 1122. In some embodiments, the data pre-processing module 1118 is applied to process the scan images 108 to form a ROTA map 110 or preprocess the ROTA map 110. The model-based processing module 1120 applies the trained machine learning model 120 provided by the model training module 1102 to process the ROTA map 110 to determine the visual field sensitivity 112 of a retina. The model-based processing module 1120 can also monitor an error indicator to determine whether the ROTA map 110 has been properly processed by the machine learning model 120. In some embodiments, the visual field sensitivity 112 is further processed by the data post-processing module 1122 to present the visual field sensitivity 112 in a preferred format (e.g., the visual field sensitivity map 1008 in FIGS. 10B and 10C) or to provide other related information that can be derived from the visual field sensitivity (VFS) 112.

The computer system 1100 includes an OCT device 102, one or more computer devices 104, and one or more servers 106. The OCT device 102 is located at a venue remote from the server 106, and generates a plurality of scan images 108 of a retina. In some embodiments, the OCT device 102 processes the scan images 108 to generate the ROTA map 110 locally, sends the scan images 108 to the server 106, which generates the ROTA map 110 remotely, or sends the scan images 108 to a first computer device 104A to generate the ROTA map 110. In some embodiments, the first computer device 104 is located at the same venue as the OCT device 102 or at a different venue from the OCT device 102. In some embodiments, the model training module 1102 and the data processing module 1104 are separately located on a server 106 and another device. The machine learning model 120 is trained at the server 106 and deployed to the OCT device 102 or to a second computer device 104B distinct from the OCT device 102. In some embodiments, the second computer device 104B is located at the same venue of the OCT device 102 or at a different venue from the OCT device 102. The OCT device 102 or second computer device 104B obtains the ROTA map 110 and determine visual field sensitivity 112 of a retina from the ROTA map 110.

Alternatively, in some embodiments, both the model training module 1102 and the data processing module 1104 are located on the server 106 of the computer system 1100, while a training data source 1106 provides training data 1108. The server 106 trains the machine learning model 120. After obtaining the ROTA map 110 from the OCT device 102, from the first computer device 102B, or from its own storage, the server 106 determines the visual field sensitivity 112 from the ROTA map 110. In an example, only the OCT device 102 and server 106 are involved in determining the visual field sensitivity 112 from the scan images 108. The OCT device 102 uploads the plurality of scan images 108 to the server 106, and the server 106 generates the ROTA map 110 and determines the visual field sensitivity 112 of the retina. Each of the OCT device 102, computer devices 104A and 104B, and the server 106 may provide the scan images 108, ROTA map 110, or the visual field sensitivity 112 of the retina to a third computer device 104C associated with a doctor 122 or a patient for review.

Figure 11B:
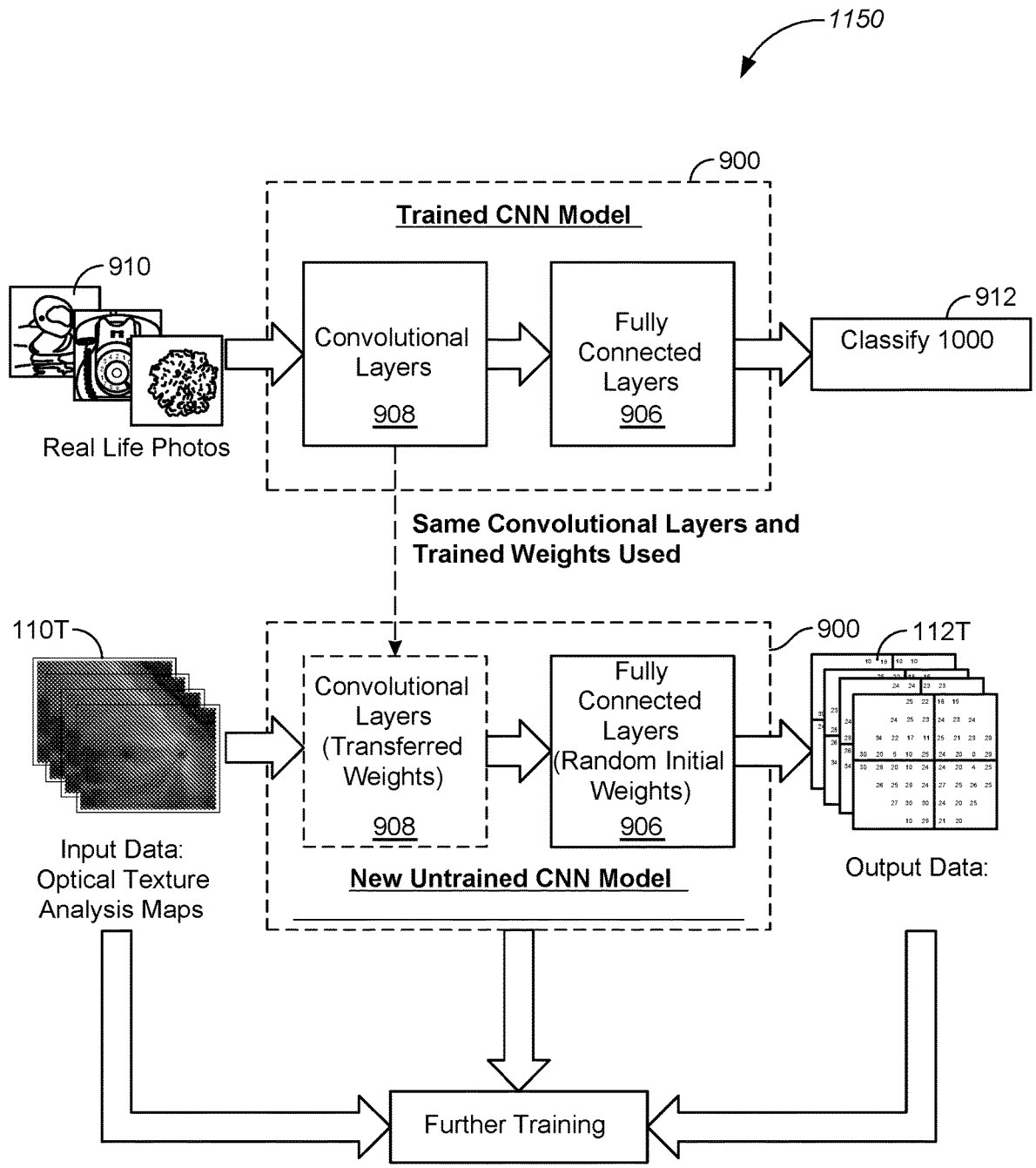
FIG. 11B is an example process of training a CNN-based machine learning model based on a transfer learning mechanism, in accordance with some embodiments.

FIG. 11B is an example process 1150 of training a CNN-based machine learning model 900 (also called CNN 900) based on a transfer learning mechanism, in accordance with some embodiments. The CNN 900 includes a plurality of convolutional layers 908 forming one or more convolutional blocks 904 and one or more fully connected layers 906 coupled to the plurality of convolutional layers 908. The CNN 900 is configured to receive the ROTA maps 110 and determine visual field sensitivity 112 of a retina. The CNN 900 is trained using an alternative dataset 1110 that is distinct from the training dataset 1108 that includes the set of training ROTA maps 110T. In an example, the alternative dataset 1110 includes a plurality of real life photos independent of the ROTA maps 110T. The CNN 900 is thereby trained using the alternative dataset 1110 to predict information 1112 unrelated to visual field sensitivities (e.g., determine classification of the plurality of real life photos). The CNN 900 resulting from training using the alternative dataset 1110 continues to be trained using the set of training ROTA maps 110T. In some embodiments, at least an input layer and an output layer in the CNN 900 are modified to adapt to the set of training ROTA maps 110T for prediction of the visual field sensitivity 112T while intermediate layers between the input and output layers of the CNN 900 remain unchanged. Alternatively, in some embodiments, after being trained using the alternative images 1110, the CNN 900 continues to be trained using the set of training ROTA maps 110T without limiting changes to specific layers of the CNN 900.

Figure 12:
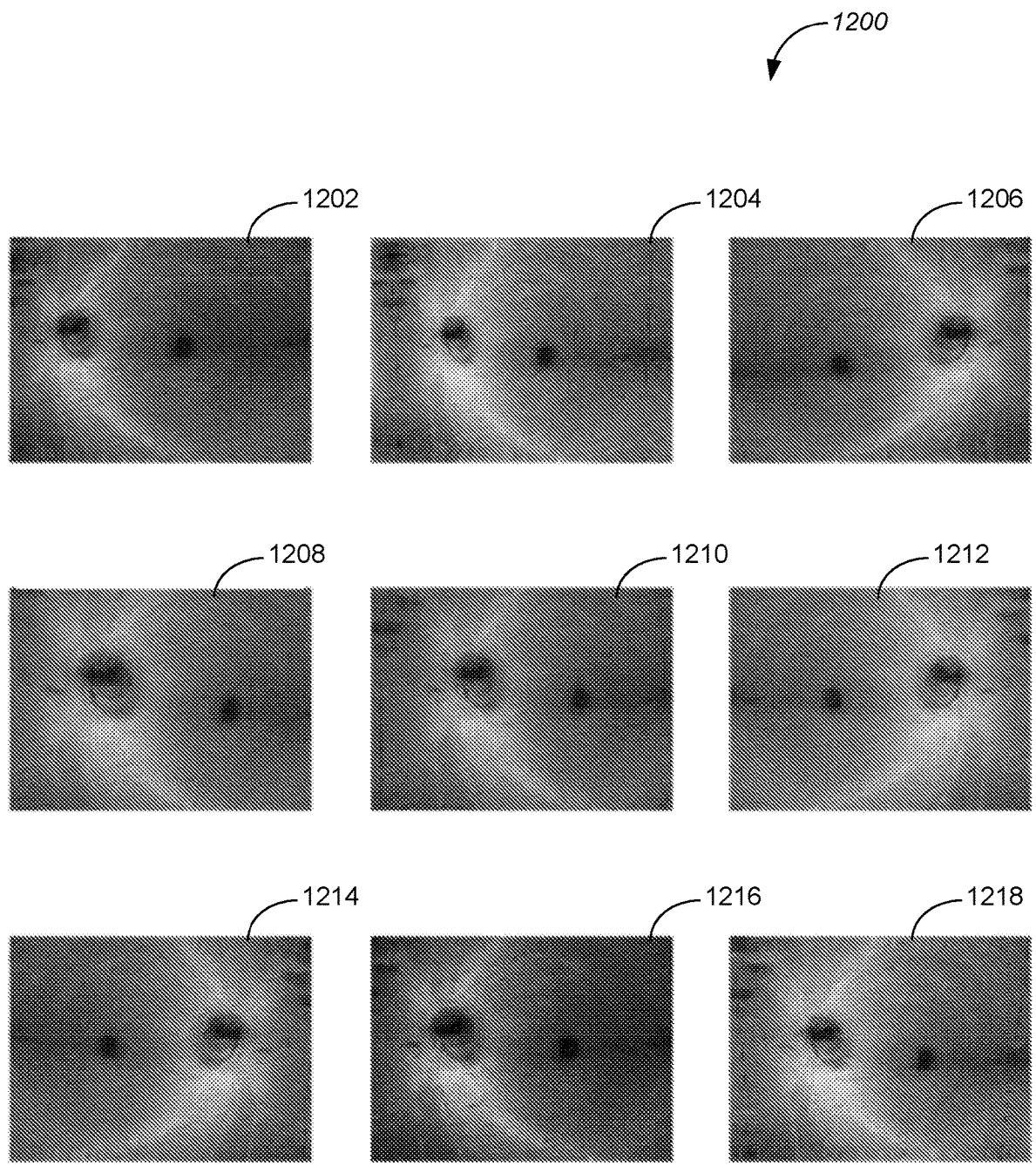
FIG. 12 illustrates a plurality of augmentation schemes of an ROTA map of an inner retinal layer (e.g., RNFL), in accordance with some embodiments.

FIG. 12 illustrates a plurality of augmentation schemes 1200 of a ROTA map 110 of an inner retinal layer (e.g., RNFL), in accordance with some embodiments. Data augmentation techniques are applied to an original ROTA map 1202 in a training dataset 1108 for the purposes of training a machine learning model 120. Additional ROTA maps 1204-1218 are generated from the original ROTA map 1202 according to the plurality of augmentation schemes 1200. Such data augmentation helps prevent the machine learning model 120 from being overfitted to the original ROTA map 1202. Each additional ROTA map 1204-1218 is slightly different from the original ROTA map 1202 in the training dataset 1108, allowing the machine learning model 120 to identify more generalized features during the course of determining visual field sensitivity 112 of a retina.

In some embodiments, augmentation of the training ROTA map 110 is a randomized image processing procedure implemented to modify at least one input to an input unit 902 of the machine learning model 120. Examples of the image processing procedure include, but are not limited to:
blinding the superior half or inferior half of scanned retinal region on the original ROTA map 1202 with zeros or random intensity values;
resizing or mirroring;
rotating by a random angle not larger than 30 degrees;
zooming to at a random scale that preserves an optic disc region and a macular region;
removing a selected portion of the original ROTA map 1202;
flipping horizontally;
changing the brightness;
change of contrast;
adding padding pixels on the side;
skewing with random direction and magnitude;
squishing;
tilting;
warping the perspective;
warping symmetrically;
adding noise;
jittering;
removing random holes on the maps;
adding an image of defect; and
combining any two or more of the above augmentation methods.

Figure 13:
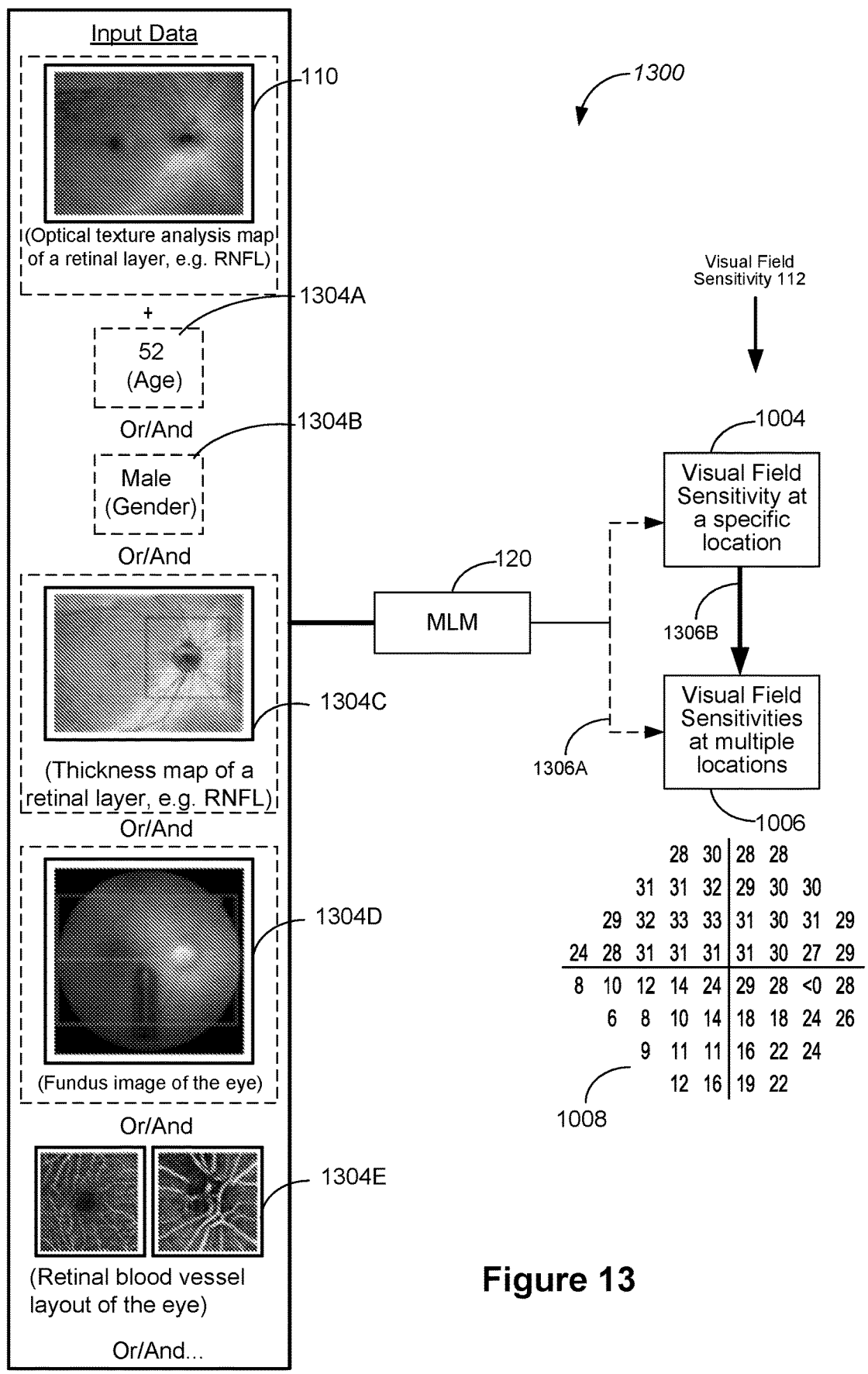
FIG. 13 is a block diagram of an example data processing system including a machine learning model receiving one or more additional data items, in accordance with some embodiments.

FIG. 13 is a block diagram of an example data processing system 1300 including a machine learning model 120 receiving one or more additional data items 1304 (e.g., items 1304A-1304E), in accordance with some embodiments. The machine learning model 120 obtains the one or more additional data items 1304 from a set of data items including, but not limited to: patient age 1304A, patient gender 1304B, a refractive error, a thickness map 1304C of the inner retinal layer, a projection image of a scanned portion of the retina, a fundus image 1304D of the retina, a retinal blood vessel layout image 1304E, a subset of the plurality of cross-sectional scan images 108 of the retina, one or more cross-sectional scan images of an anterior segment of the eye, and a plurality of ocular geometrical parameters including an axial length and a corneal curvature. The machine learning model 120 is applied to process the ROTA map 110 and the one or more additional data items 1304 jointly to determine the visual field sensitivity 112 of the retina.

In some embodiments, the visual field sensitivity 112 of the retina includes a target local visual field sensitivity value 1004 for each target visual field location. Alternatively, in some embodiments, the visual field sensitivity 112 of the retina includes a plurality of local visual field sensitivity values 1006, each of which corresponds to a distinct selected visual field location. In some embodiments, the plurality of visual field sensitivity values 1006 are combined to generate a visual field sensitivity map 1008. In some embodiments, the distribution of the plurality of visual field sensitivity values 1006 on the visual field sensitivity map 1008 follows one of the three predefined perimetry tests in FIGS. 7A-7C. In some embodiments, the plurality of local visual field sensitivity values 1006 are directly generated (1306A) from the machine learning model 120. In some embodiments, the plurality of local visual field sensitivity values 1006 are formed by combining the target local visual field sensitivity value 1004, and are therefore indirectly generated (1306B) from the machine learning model 120. Alternatively, in some embodiments not shown in FIG. 13, the visual field sensitivity 112 of the retina includes one or more regional visual field sensitivity indexes indicating a regional sensitivity level of a selected region of the eye or one or more global visual field sensitivity indexes indicating an overall sensitivity level of the retina.

Figure 14:
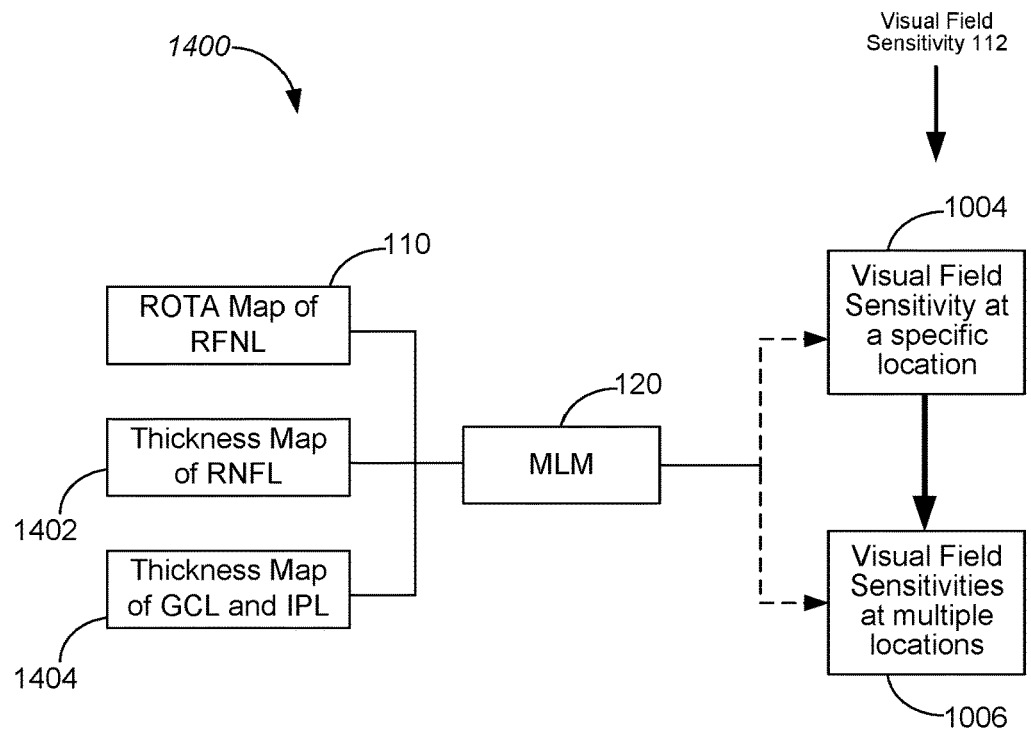
FIG. 14 is a block diagram of another example data processing system including a machine learning model, in accordance with some embodiments.

FIG. 14 is a block diagram of another example data processing system 1400 including a machine learning model 120, in accordance with some embodiments. The machine learning model 120 obtains the ROTA map 110 of an RFNL. The one or more additional data items include a thickness map 1402 of the RFNL and a thickness map 1404 of a GCL and an IPL. In some embodiments, each of the thickness maps 1402 and 1404 is determined from a plurality of scan images 108 captured by an OCT device 102. The machine learning model 120 has an input unit (e.g., a single input neural network layer) configured to receive the ROTA map 110 and thickness maps 1402 and 1404. The machine learning model 120 (e.g., CNN 900) is applied to process the ROTA map 110 and the thickness maps 1402 and 1404 jointly to determine the visual field sensitivity 112 of the eye (e.g., a target visual field sensitivity 1004 at a target visual field location, a plurality of visual field sensitivity values 1006, a visual field sensitivity map 1008, one or more regional visual field sensitivity indexes, or one or more global visual field sensitivity indexes).

Figure 15:
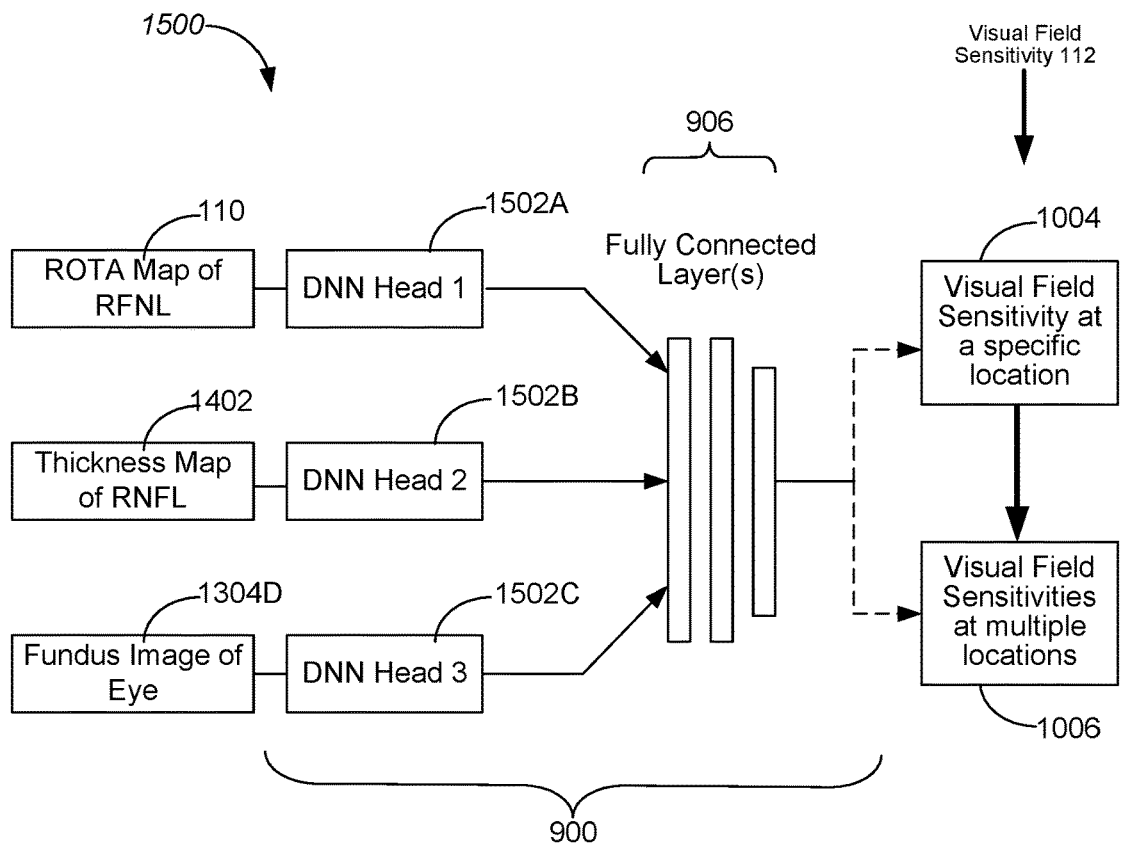
FIG. 15 is a block diagram of another example data processing system including a multi-headed deep neural network (DNN) model having a plurality of parallel DNN heads, in accordance with some embodiments.

FIG. 15 is a block diagram of another example data processing system 1500 including a multi-headed deep neural network (DNN) model having a plurality of parallel DNN heads, in accordance with some embodiments. The model includes the plurality of parallel DNN heads 1502A, 1502B, and 1502C and an ensemble network coupled to the plurality of parallel DNN heads 1502. The ensemble network includes one or more fully connected layers 906. The plurality of parallel DNN heads 1502 of the model are configured to receive the ROTA map 110 and the one or more additional data items at an input of the model. For example, a first DNN head 1502A is configured to receive the ROTA map 110, and a second DNN head 1502B and a third DNN head 1502C are configured to receive a thickness map of the RNFL 1402 and a fundus image 1304D, respectively. The one or more intermediate layers (e.g. fully connected layer 906) are configured to generate the visual field sensitivity 112 at the output of the model by combining features outputted by the plurality of DNN heads 1502. Examples of the visual field sensitivity 112 of the retina include one or more of: a target visual field sensitivity 1004 at a target visual field location, a plurality of visual field sensitivity values 1006, a visual field sensitivity map 1008, one or more regional visual field sensitivity indexes, or one or more global visual field sensitivity indexes.

Each of the ROTA map 110, the thickness map of RNFL 1402, and fundus image 1304D is received at a respective input of the plurality of DNN heads 1502 (e.g., a respective input layer of a respective DNN head 1502A, 1502B, or 1502C). Each of the DNN heads 1502 is optimized to process features for the respective type of data (e.g. the DNN heads 1502A, 1502B, and 1502C are optimized to process the ROTA map 110, thickness map of RNFL 1402, and fundus image 1304D, respectively).

Figure 16:
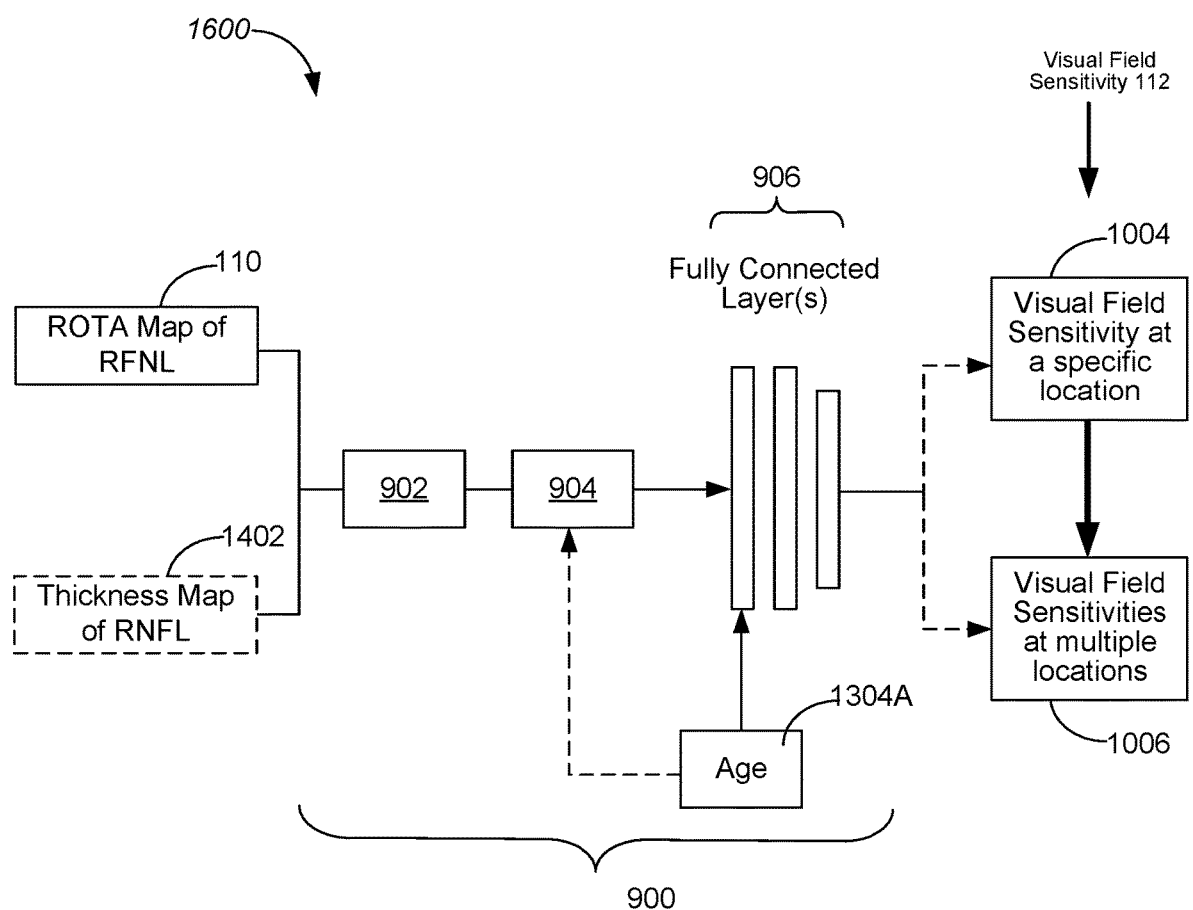
FIG. 16 is a block diagram of another example data processing system including a CNN-based machine learning model 900 that receives at least one additional data item (e.g., patient age) via a layer distinct from an input layer, in accordance with some embodiments.

FIG. 16 is a block diagram of another example data processing system 1600 including a CNN-based machine learning model 900 that receives at least one additional data item (e.g., patient age 1304A) via a layer distinct from an input layer, in accordance with some embodiments. The CNN 900 further includes an input unit 902, a series of convolutional blocks 904 coupled to the input unit 902, and one or more fully connected layers 906 coupled to the series of convolutional blocks 904. The CNN 900 receives the ROTA map 110 and the at least one additional data item (e.g., patient age 1304A) via the input unit 902 and an input of the one or more fully connected layers 906. The CNN 900 is applied to process the ROTA map 110 and patient age 1304A jointly to determine the visual field sensitivity 112 of the retina (e.g., a target visual field sensitivity 1004 at a target visual field location, a plurality of visual field sensitivity values 1006, a visual field sensitivity map 1008, one or more regional visual field sensitivity indexes, or one or more global visual field sensitivity indexes).

In some embodiments, the CNN 900 receives the ROTA map 110 and one or more additional data items (e.g., the thickness map of RNFL 1402) via the input unit 902, while receiving the patient age 1304A via an input of the one or more fully connected layers 906. For example, the CNN 900 is applied to process the ROTA map 110, patient age 1304A, and thickness map of RNFL 1402 jointly to determine the visual field sensitivity 112 of the retina. Alternatively, in some embodiments, the additional data item (e.g., patient age 1304A) is received by a layer of the series of convolutional blocks 904. The CNN 900 is applied to process at least the ROTA map 110 and at least one additional data item (e.g., patient age 1304A) jointly to determine the visual field sensitivity 112 of the retina.

Figure 17A:
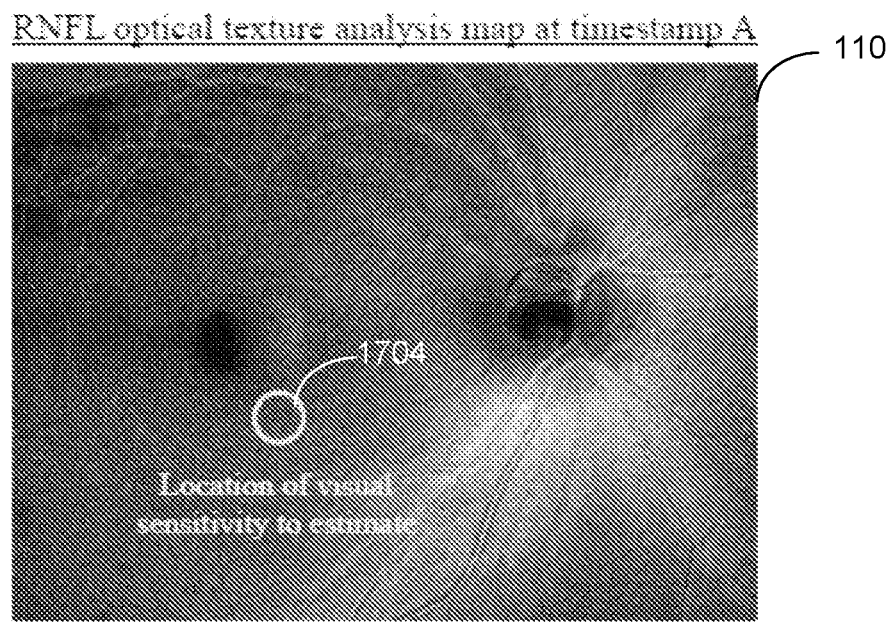
FIG. 17A is an example ROTA image, in accordance with some embodiments.
Figure 17B:
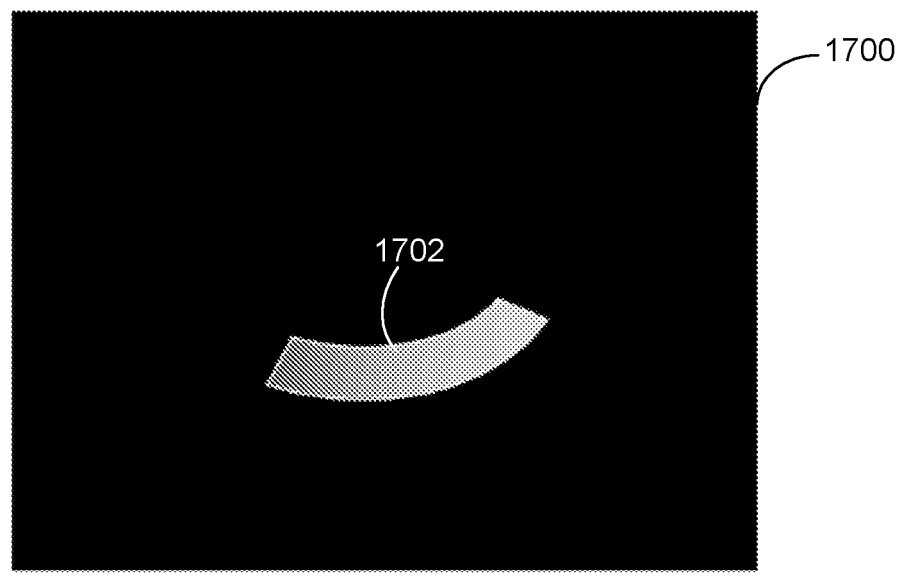
FIG. 17B is an example map including a trajectory of features, in accordance with some embodiments.
Figure 18:
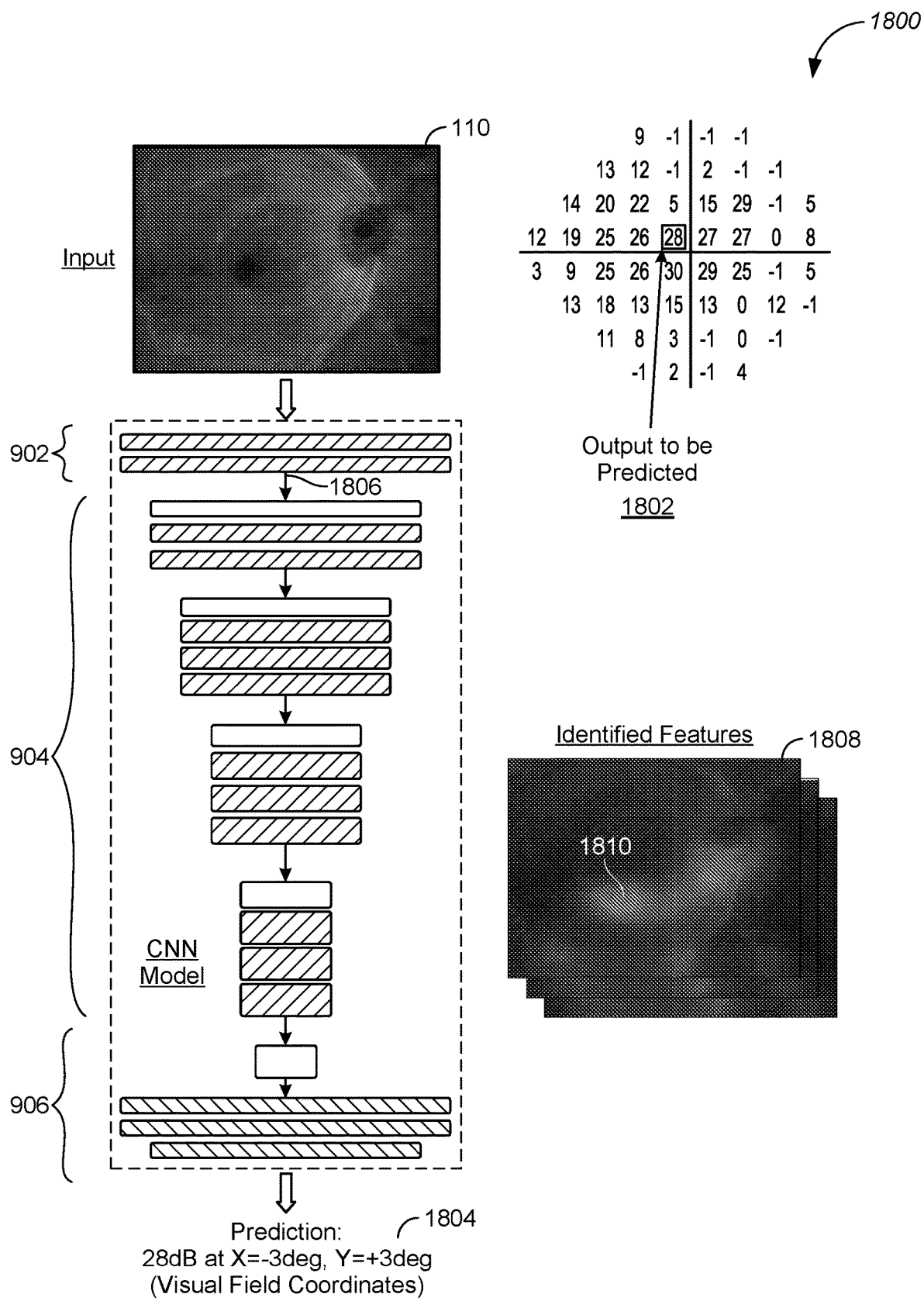
FIG. 18 shows a process of monitoring the trajectory of features in a CNN-based machine learning model, in accordance with some embodiments.

A retinal location within a defect region on a ROTA map of the inner retinal layer is oftentimes associated with loss of sensitivity at the corresponding location in the visual field of the eye. FIG. 17A is an example ROTA image 110, in accordance with some embodiments, and FIG. 17B is an example heat map 1700 including a trajectory 1702 of features, in accordance with some embodiments. FIG. 18 is a process 1800 of monitoring the trajectory 1702 of features in a CNN-based machine learning model 900, in accordance with some embodiments. The ROTA image 110 includes a retinal location 1704. The retinal location 1704 is located on a trajectory of nerve fibers connecting to the optic nerve. In some situations, the retinal location 1704 is associated with a loss of visual field sensitivity, which is caused by the loss of the nerve fibers along the trajectory. The machine learning model 120 is configured to identify a trajectory 1702 of features corresponding to the target retinal location, independently of whether the retinal location 1704 is inside or outside a scanned portion of the retina. The trajectory 1702 of features corresponds to the retinal location 1704 and indicates that visual field sensitivity 112 associated with the retinal location 1704 is impacted by visual field sensitivity values of a series of related visual field locations on the trajectory 1702. The trajectory 1702 of features corresponds to the trajectory of nerve fibers connected to the retinal location 1704, and can be used to identify a root cause of a loss of visual field sensitivity associated with the retinal location 1704.

In some embodiments, the retinal location 1704 corresponds to a target visual field location 1802 having a target visual field sensitivity value 1804. The respective retinal location 1704 is used to predict the output value 1802 and corresponding target visual field sensitivity value 1804 that is determined by the CNN 900. The CNN 900 includes a plurality of intermediate layers in an input unit 902, convolutional blocks 904, and fully connected layers 906. While the CNN 900 processes the ROTA map 110, each of the plurality of intermediate layers of the CNN 900 generates a respective feature map 1806. A series of related feature maps 1808 are extracted from respective feature maps 1806 of the plurality of intermediate layers of the CNN 900. A respective weight is extracted for each of the extracted series of feature maps 1808. The extracted series of features 1808 are visualized according to the respective weights in a heat map 1700.

In an example, 5 related feature maps 1808 are extracted from last 5 intermediate layers of the CNN 900, and the respective weight corresponds to a bright region 1810 that is near the target visual field location 1802 in a respective extracted feature map 1808. The respective weight and corresponding bright region 1810 are associated with the optical texture signatures S of the retinal location 1704. The heat map 1700 highlights bright regions 1810 that result from a subset of intermediate layers of the CNN 900 and determine the target visual field sensitivity value 1804 of the target visual field location 1802.

The trajectory 1702 of features corresponds to the trajectory of the retinal nerve fiber bundle related to the visual field sensitivity 112 (specifically, the target visual field sensitivity value 1804). Referring to FIG. 17B, the heat map 1700 visually highlights the trajectory of the retinal nerve fiber bundle based on the respective weight of each feature of the extracted series of features 1808. When a first subset of the extracted series of features is associated with the visual field sensitivity 112, a computer system 1100 assigns first weights to the first subset of extracted features as shown in trajectory 1702 of FIG. 17B. The trajectory 1702 is related to the first subset of the extracted series of features. When a second subset of the extracted series of features is not associated with the visual field sensitivity 112, the computer system 1100 assigns second weights (e.g., "0") to the second subset of extracted features. The first weights are greater than the second weights. In an example, the second weights are equal to 0. The trajectory 1702 is displayed based on the first weight that varies on the heat map 1700, while a remaining area of the heat map 1700 is completely dark based on the second weight to highlight the trajectory 1702.

In some embodiments, the ROTA map 110 of the same eye has a topographic orientation consistent with that of an OCT scan. Between two OCT scans, the topographic orientations vary by an angle, and the weighted heat maps 1700 of features show that the same trajectory 1702 rotates by the angle. For example, a first ROTA map of the RNFL is determined for a patient's right eye and corresponds to a first ROTA orientation at a first time instant. A weighted heat map 1700 is created to represent features associated with the visual field sensitivity at 3 degrees superior, 3 degrees nasal to a center of vision. The same eye is scanned again at a second time instant. A second ROTA map is generated with a second ROTA orientation different from the first ROTA orientation. The machine learning model 120 is trained to process the ROTA maps, detect relevant geometrical/anatomical information including centers of the macula and the optic disc, and generate the visual field sensitivity 112. The weighted heat map 1700 shows the trajectory 1702, which rotates with the ROTA maps of the first and second time instants.

Figure 19:
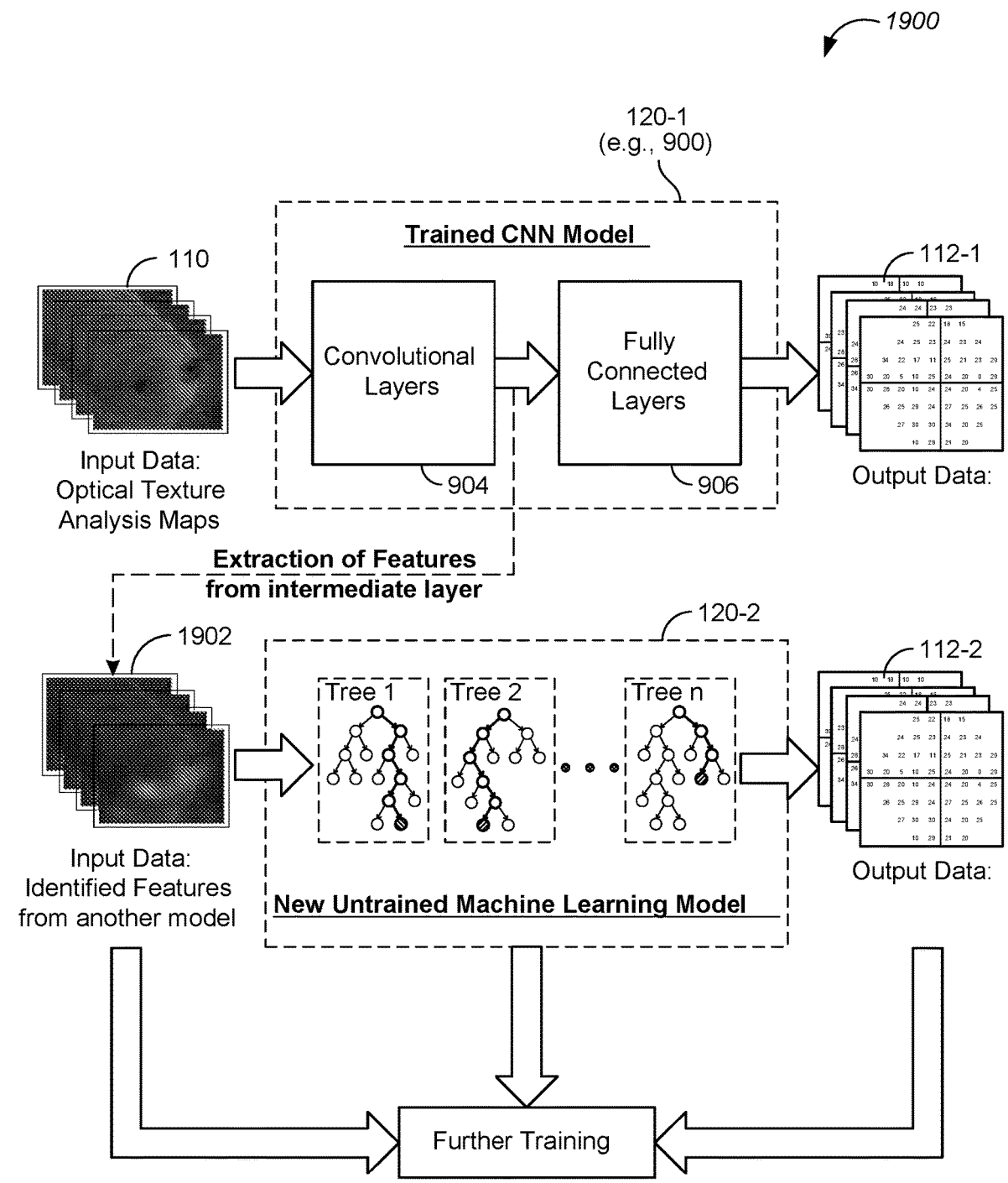
FIG. 19 is a flow diagram of a process of training a second machine learning model based on a first machine learning model, in accordance with some embodiments.

FIG. 19 is a flow diagram of a process 1900 for training a second machine learning model 120-2 based on a first machine learning model 120-1, in accordance with some embodiments. The first machine learning model 120-1 is trained to process a ROTA map 110 of an inner retinal layer to determine a first visual field sensitivity 112-1 of the retina. The first machine learning model 120-1 includes an input layer, an output layer, and a plurality of intermediate layers, and provides a respective intermediate feature 1902 (e.g., a feature map 1808 in FIG. 18) via each of the input layer and the plurality of intermediate layers. At least a subset of intermediate features 1902 are extracted and provided to the second machine learning model 120-2 as an input. The second machine learning model 120-2 is trained to generate a second visual field sensitivity 112-2 of the retina. The second visual field sensitivity 112-2 is generated from the second machine learning model 120-2, which receives a set of features 1902 that are extracted from one or more intermediate layers of the first trained machine learning model 120-1 configured to process the ROTA map 110.

In an example, the first machine learning model 120-1 includes a CNN 900 further including a plurality of convolutional layers 904 (i.e., a series of convolutional blocks) and one or more fully connected layers 906. Examples of the second machine learning model 120-2 include, but are not limited to, a CNN, a support vector machine (SVM) model, a random forest model, or a gradient boosting model. Alternatively, in some embodiments, the first machine learning model 120-1 is one of a SVM model, a random forest model, or a gradient boosting model, and the second machine learning model 120-2 is a CNN 900.

The first and second machine learning models 120-1 and 120-2 are configured to determine the same visual field sensitivity 112 or two different visual field sensitivities 112. For example, the first machine learning model 120-1 generates a target visual field sensitivity value 1004 at a target visual field location, while the second machine learning model 120-2 generates a global visual field sensitivity index. In some embodiments, the first visual field sensitivity 120-1 is applied as ground truth visual field sensitivity to train the second machine learning model 120-2. Weights of the second machine learning model 120-2 are adjusted to match the second visual field sensitivity 112-2 with the first visual field sensitivity 120-1 (e.g., within a tolerance). Both the first and second machine learning models 120-1 and 120-2 are configured to determine the same visual field sensitivity 112. Alternatively, in some embodiments, weights of the second machine learning model 120-2 are adjusted based on a loss that is independent of the first visual field sensitivity 120-1. In some situations, training of the second machine learning model 120-2 is unsupervised.

Figure 20:
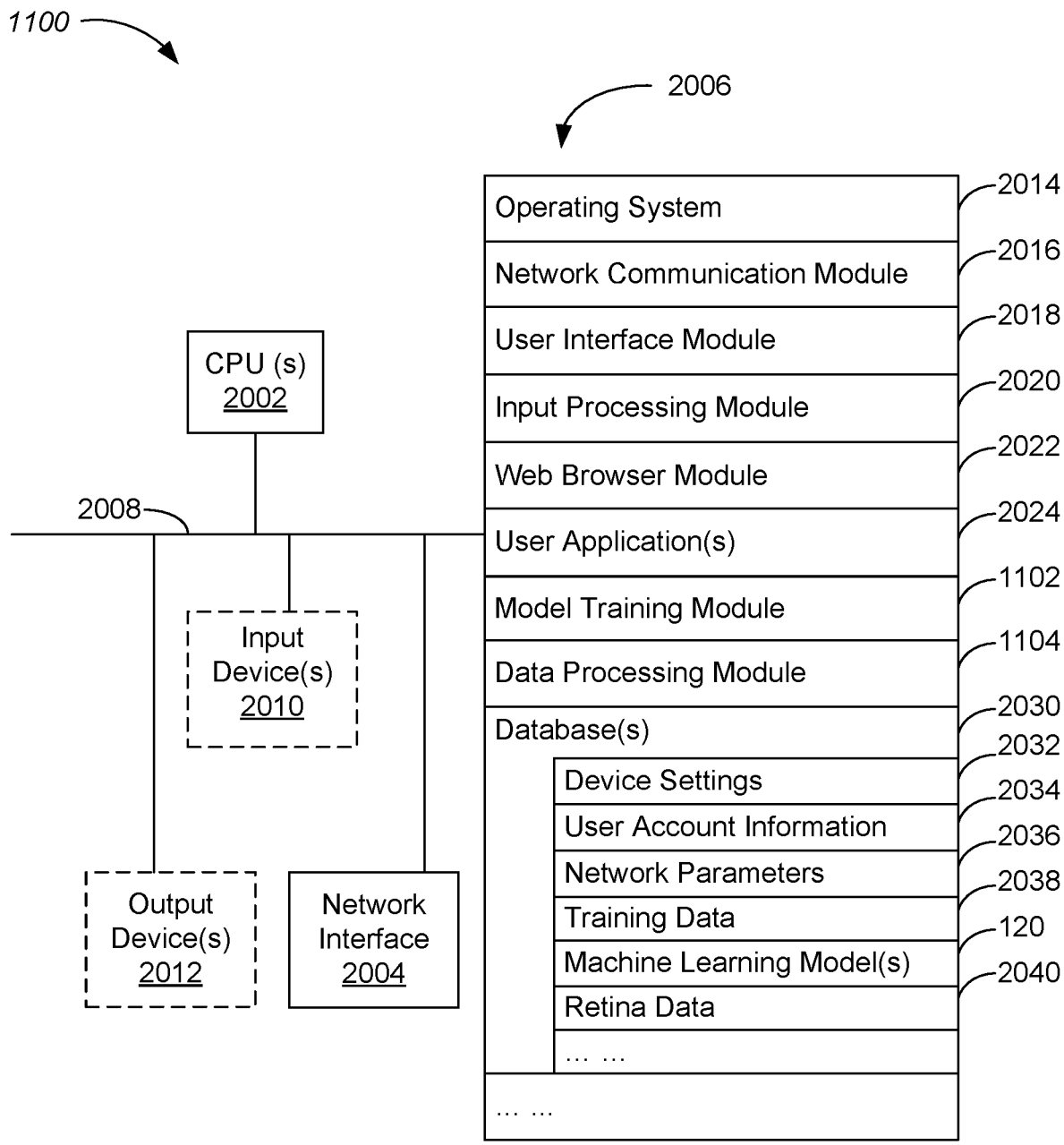
FIG. 20 is a block diagram of a computer system that determines visual field sensitivity of a retina from a plurality of OCT scan images of the retina, in accordance with some embodiments.

FIG. 20 is a block diagram of a computer system 1100 configured to determine visual field sensitivity 112 of a retina from a plurality of OCT scan images 108 of the retina, in accordance with some embodiments. In some embodiments, the computer system 1100 includes a server 106, an OCT device 102, a first computer device 104A, a second computer device 104B, or a combination thereof. The computer system 1100 typically includes one or more processing units (CPUs) 2002, one or more network interfaces 2004, memory 2006, and one or more communication buses 2008 for interconnecting these components (sometimes called a chipset). The computer system 1100 includes one or more input devices 2010 that facilitate user input, such as a keyboard, a mouse, a voice-command input unit or microphone, a touch screen display, a touch-sensitive input pad, a gesture capturing camera, or other input buttons or controls. Furthermore, in some embodiments, the computer system 1100 uses a microphone and voice recognition or a camera and gesture recognition to supplement or replace the keyboard. In some embodiments, the computer system 1100 includes one or more cameras, scanners, or photo sensor units. The computer system 1100 also includes one or more output devices 2012 that enable presentation of user interfaces and display content, including one or more speakers and/or one or more visual displays.

The memory 2006 includes high-speed random access memory, such as DRAM, SRAM, DDR RAM, or other random access solid state memory devices. In some embodiments, the memory 2006 includes non-volatile memory, such as one or more magnetic disk storage devices, one or more optical disk storage devices, one or more flash memory devices, or one or more other non-volatile solid state storage devices. In some embodiments, the memory 2006 includes one or more storage devices remotely located from one or more processing units 2002. The memory 2006, or alternatively the non-volatile memory within the memory 2006, includes a non-transitory computer readable storage medium. In some embodiments, the memory 2006, or the non-transitory computer readable storage medium of the memory 2006, stores the following programs, modules, and data structures, or a subset or superset thereof:

- an operating system 2014, which includes procedures for handling various basic system services and for performing hardware dependent tasks;
- a network communication module 2016, which connects each OCT device 102, computer device 104, or server 106, to other devices via one or more network interfaces 2004 (wired or wireless) and one or more communication networks 118, such as the Internet, other wide area networks, local area networks, metropolitan area networks, and so on;
- a user interface module 2018, which enables presentation of information (e.g., a graphical user interface for application(s) 2024, widgets, websites and web pages thereof, and/or games, audio and/or video content, or text) at each OCT device 102, computer device 104, or server 106 via one or more output devices 2012 (e.g., displays or speakers);
- an input processing module 2020, which detects one or more user inputs or interactions from one of the one or more input devices 2010 and interprets the detected input or interaction;
- a web browser module 2022, which navigates, requests (e.g., via HTTP), and displays websites and web pages thereof, including a web interface for logging into a user account associated with an OCT device 102, a computer device 104, a server 106, or another electronic device. The web browser 2022 may control the OCT device 102 or the computer device 104 when associated with a user account, enabling a user to edit and/or review settings and data that are associated with the user account;
- one or more user applications 2024, which execute by the computer system 1100 (e.g., an eye monitoring application or other web or non-web based applications for reviewing scan images 108, ROTA maps 110, or visual field sensitivity 112 of a retina);
- a model training module 1102, which receives training data including pairs of training ROTA maps and visual field sensitivities. The training module 1102 builds a machine learning model 120 for processing ROTA maps 110 determined from scan images 108 of a retina;
- a data processing module 1104, which determines visual field sensitivity 112 from scan images 108 and/or ROTA maps 110 of a retina. In some embodiments, the data processing module 1104 is associated with an eye monitoring application that implements a task for scanning a retina, analyzing eye data, and/or reporting retinal analytic results;
- one or more databases 2030, which store one or more of:
  device settings 2032, including common device settings (e.g., service tier, device model, storage capacity, processing capabilities, and/or communication capabilities) of each OCT device 102, computer device 104, or server 106;
  user account information 2034 for the one or more user applications 2024 (e.g., user names, security questions, account history data, user preferences, and predefined account settings);
  network parameters 2036 for the one or more communication networks 118 (e.g., IP address, subnet mask, default gateway, DNS server, and host name);
  training data 2038 for training one or more machine learning models 120. The training data 2038 includes a plurality of pairs of training ROTA maps and corresponding visual field sensitivities;
  machine learning models 120 for processing ROTA maps 110 determined from scan images 108 of a retina; and
  eye data 2040, including at least cross-sectional scan images 108 of a retina acquired by an OCT device 102, ROTA maps 110 of an inner retinal layer, and visual field sensitivities 112 of a retina.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 2006 stores a subset of the modules and data structures identified above. In some embodiments, the memory 2006 stores additional modules and data structures not described above.

Figure 21:
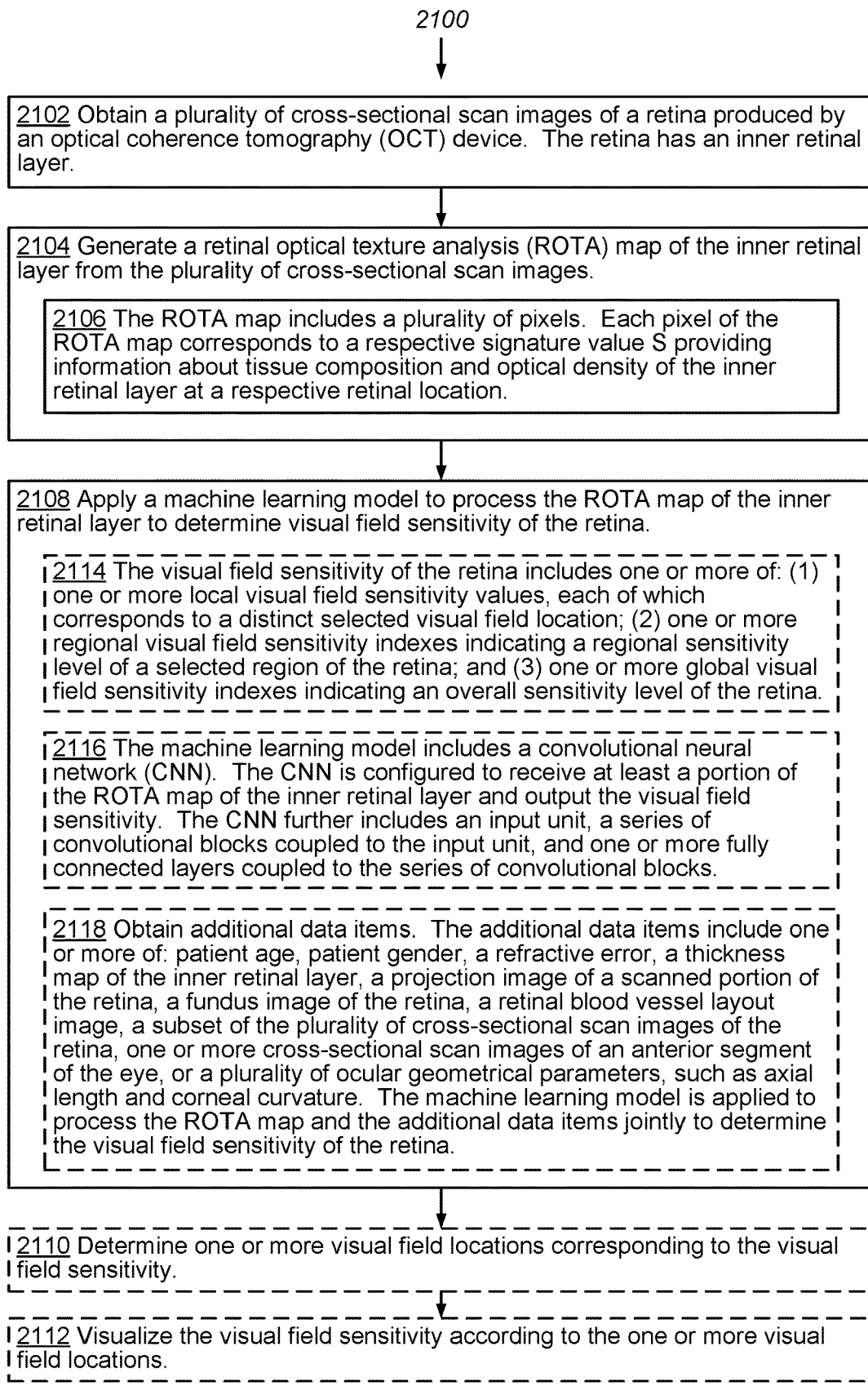
FIG. 21 is a flowchart illustrating an exemplary process for monitoring a visual field of a patent's eye (e.g., including determining visual field sensitivity), in accordance with some embodiments.

FIG. 21 is a flowchart illustrating a method 2100 for monitoring the visual field of a patent's eye (e.g., including determining visual field sensitivity), in accordance with some embodiments. For convenience, the method 2100 is described as being implemented by a computer system 1100. In some embodiments, the method 2100 is governed by instructions that are stored on a non-transitory computer readable storage medium. The instructions are executed by one or more processors of the electronic system. Each of the operations shown in FIG. 21 may correspond to instructions stored in computer memory or on a non-transitory computer readable storage medium (e.g., the memory 2006 of the computer system 1100 in FIG. 20). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method 2100 may be combined and/or the order of some operations may be changed.

The computer system 1100 obtains (2102) a plurality of cross-sectional scan images 108 of a retina acquired by an optical coherence tomography (OCT) device 102. The retina has an inner retinal layer. The computer system 1100 generates (2104) a retinal optical texture analysis (ROTA) map 110 of the inner retinal layer from the plurality of cross-sectional scan images 108. The ROTA map 110 includes (2106) a plurality of pixels, and each pixel of the ROTA map 110 corresponds to a respective signature value S (also called optical texture signature value S) providing information about tissue composition and optical density of the inner retinal layer at a respective retinal location. The computer system 1100 applies (2108) a machine learning model 120 to process the ROTA map 110 of the inner retinal layer to determine visual field sensitivity 112 of the retina. In some embodiments, the inner retinal layer is one of: a retinal nerve fiber layer, a ganglion cell layer, an inner plexiform layer, a combination of the retinal nerve fiber layer and the ganglion cell layer, a combination of the ganglion cell layer and the inner plexiform layer, or a combination of the retinal nerve fiber layer, the ganglion cell layer, and the inner plexiform layer.

In some embodiments, the computer system 1100 determines (2110) one or more visual field locations corresponding to the visual field sensitivity 112 and visualizes (2112) the visual field sensitivity 112 according to the one or more visual field locations (e.g., on a graphical user interface (GUI)). In some embodiments, the computer system 1100 executes an eye monitoring application configured to monitor retinal conditions of different patients. The eye monitoring application is configured to provide an analysis report including information about local, regional, and/or global visual field sensitivity determined by the machine learning model 120. In some embodiments, the application uses graphical visualization. In some embodiments, the machine learning model 120 is trained to generate a set of first field sensitivity values corresponding to a set of first visual field locations defined by a first perimetry pattern. During data inference, a set of target field sensitivity values are determined by the machine learning model 120 and combined to map the visual field sensitivity 112. The set of target field sensitivity values correspond to a set of target visual field locations defined by a second perimetry pattern. In some embodiments, the second perimetry pattern is the same as the first perimetry pattern. In some embodiments, the second perimetry pattern is different from the first perimetry pattern. Further, in some embodiments, a subset of target visual field locations of the second perimetry pattern is the same as a corresponding subset of visual field location of the first perimetry pattern.

In some embodiments, the visual field location is different from the retinal location. For example, a stimulus occurs at 9 degrees to the left of the center of the visual field of different patients, and it is projected onto different retinal locations in different eyes depending on individual eye geometry. As a local visual field sensitivity value is predicted by the machine learning model 120, the local visual field sensitivity value is determined for a visual field location, not to a retinal location.

In some embodiments, referring to FIGS. 6A and 6B, the computer system 1100 generates the ROTA map 110 of the inner retinal layer from the plurality of cross-sectional scan images 108 by identifying a plurality of boundary lines of the inner retinal layer (e.g., the RNFL 604) of the retina in each of the plurality of cross-sectional scan images 108 of the retina. The computer system 1100 determines a reflectance value P (e.g., $P_{z,xy}$) for each pixel in the inner retinal layer of the retina and for each pixel of the ROTA map 110 corresponding to the respective retinal location. The computer system determines the optical texture signature value S (e.g., $S_{xy}$) corresponding to the retinal location based on a set of reflectance values P extracted from one or more corresponding cross-sectional scan images 108.

In some embodiments, referring to FIG. 10A, the computer system 1100 receives information identifying one or more distinct visual field locations 1002 corresponding to the visual field sensitivity 112 of the eye, and trains or uses the machine learning model 120 to predict one or more local visual field sensitivity values at the one or more visual field locations.

In some embodiments, a visual field location associated with each local visual field sensitivity value corresponds to a retinal location within a scanned portion of the retina or a retinal location external to the scanned portion of the retina. Referring to FIGS. 17A and 17B, every retinal location (e.g., the retinal location 1704) is associated with a trajectory 1702 of nerve fibers connecting to the optic nerve. In some embodiments, loss of visual field sensitivity at a retinal location is caused by loss of nerve fibers along the associated trajectory. The machine learning model 120 is configured to identify the trajectory 1702 of nerve fibers on the ROTA map 110 corresponding to a target retinal location 1704 even if the target retinal location 1704 is external to the scanned portion of the retina.

In some embodiments, the visual field sensitivity 112 of the retina includes (2114) one or more of: (i) one or more local visual field sensitivity values, each of which corresponds to a local sensitivity level of a distinct selected visual field location; (ii) one or more regional visual field sensitivity indexes indicating a regional sensitivity level of a selected region of the retina; and (iii) one or more global visual field sensitivity indexes indicating an overall sensitivity level of the retina. Examples of the global visual field sensitivity indexes include a visual field index (VFI), a mean deviation (MD), and a pattern standard deviation (PSD). The global visual field sensitivity index is reported in a report of a perimetry test. In some embodiments, the global visual field sensitivity is determined solely based on a scanned portion of the retina. Alternatively, in some embodiments, the global visual field sensitivity is determined based on a scanned portion of the retina and an external portion of the retina distinct from the scanned portion.

In some embodiments, based on the machine learning model 120, the computer system 1100 determines a plurality of local visual field sensitivity values 1006 corresponding to a plurality of distinct visual field locations and combines the plurality of local visual field sensitivity values 1006 to generate a map 1008 of visual field sensitivity of the retina. The ROTA map 110 has a first resolution, and the map 1008 of the visual field sensitivity of the retina has a second resolution. The first resolution is greater than the second resolution. Further, in some embodiments, the plurality of local visual field sensitivity values generate the map via the same neural network. Alternatively, in some embodiments, referring to FIG. 10C, the plurality of local visual field sensitivity values includes a plurality of sensitivity sets, each having one or more local visual field sensitivity values 1044. Each sensitivity set is determined via a distinct neural network 120C (also called a head of the machine learning model 120). The plurality of sensitivity sets 1044 are combined to produce the map 1008 using an ensemble model 1046.

In some embodiments, referring to FIG. 19, the plurality of local visual field sensitivity values are generated from the same machine learning model 120, and the machine learning model 120 receives a set of features extracted from one or more intermediate layers of another trained machine learning model 120 as input.

In some embodiments, referring to FIG. 7, in accordance with a selected one of a plurality of visual field tests (also called perimetry tests), the visual field sensitivity 112 of the retina includes a predefined number of local visual field sensitivity values corresponding to a predefined number of visual field locations.

In some embodiments, referring to FIG. 9, the machine learning model 120 includes (2116) a convolutional neural network (CNN) 900. The CNN 900 is configured to receive at least a portion of the ROTA map 110 of the inner retinal layer and output the visual field sensitivity 112. The CNN 900 further includes an input unit 902, a series of convolutional blocks 904 coupled to the input unit 902, and one or more fully connected layers 906 coupled to the series of convolutional blocks 904. The input unit 902 is configured to receive at least a portion of the ROTA map 110 of the inner retinal layer. Each convolutional block 904 includes one or more serial convolutional layers. The one or more fully connected layers 906 are configured to generate the visual field sensitivity 112. In an example, the CNN 900 is a VGG-16 network in which each convolutional block 904 includes a pooling layer. In another example, the CNN 900 is a ResNet-34 network in which each convolutional block 904 does not include a pooling layer. Further, in some embodiments, referring to FIG. 8, the computer system 1100 trains the CNN using a training dataset in a supervised manner. The training dataset includes a plurality of data pairs of training ROTA maps 110 and corresponding training visual field sensitivities 112. The training visual field sensitivity is applied as ground truth during training.

In some embodiments, the machine learning model 120 is trained to determine the visual field sensitivity 112 at one or more first visual field locations. During data inference, the machine learning model 120 is applied to determine the visual field sensitivity 112 of one or more target visual field locations that are different from the first visual field locations. Alternatively, in some embodiments, the machine learning model 120 that is trained for the first visual field location is applied to determine the visual field sensitivity 112 at the same first visual field location. In an example, the machine learning model 120 is trained based on ground truth measured according to a 24-2 test pattern, and is applied during data inference to predict visual field sensitivity 112 not only for visual field locations corresponding to the 24-2 test pattern, but also for visual field locations corresponding to a 30-2 test pattern, a 10-2 test pattern, or a custom test pattern that is more relevant to a glaucoma severity condition of a patient.

In some embodiments, referring to FIG. 18, the visual field sensitivity 112 includes at least one local visual field sensitivity value 1804. The computer system 1100 predicts a respective retinal location 1704 corresponding to each local visual field sensitivity value 1804. While applying the machine learning model 120 to process the ROTA map 110, the computer system 1100 extracts a series of features 1808 from outputs of a plurality of intermediate layers of the machine learning model 120, and determines a respective weight for each of the extracted series of features. Referring to FIG. 17B, the extracted series of features 1808 is visualized according to the respective weights in a heat map 1700. Further, in some embodiments, the computer system 1100 visually highlights the trajectory 1702 of a retinal nerve fiber bundle related to the visual field sensitivity 112 based on the respective weight of each feature of the extracted series of features 1808. When a first subset of the extracted series of features is associated with the visual field sensitivity 112, the computer system 1100 assigns first weights to the first subset of extracted features. The trajectory 1702 is related to the first subset of the extracted series of features. When a second subset of the extracted series of features is not associated with the visual field sensitivity 112, the computer system 1100 assigns second weights (e.g., "0") to the second subset of extracted features. The first weights are greater than the second weights.

In some embodiments, referring to FIG. 13, the computer system 1100 obtains (2118) one or more additional data items 1304. The additional data items may include patient age 1304A, patient gender 1304B, a refractive error, a thickness map 1304C of an inner retinal layer, a projection image of a scanned portion of the retina, a fundus image 1304D of the retina, a retinal blood vessel layout image 1304E, a subset of the plurality of cross-sectional scan images 108 of the retina, one or more cross-sectional scan images of an anterior segment of the eye, and/or a plurality of ocular geometrical parameters including axial length and corneal curvature. The machine learning model 120 is applied to process the ROTA map 110 and the one or more additional data items 1304 jointly to determine the visual field sensitivity 112 of the retina. Further, in some embodiments, the machine learning model 120 includes a deep neural network (DNN) configured to receive the ROTA map 110 as an input of the DNN. The DNN further includes one or more intermediate layers (e.g. fully connected layer 906) configured to incorporate the one or more additional data items (e.g., the patient age 1304A in FIG. 16) and determine the visual field sensitivity 112 of the retina based on the one or more additional data items 1304.

In some embodiments, the machine learning model 120 further includes a deep neural network (DNN) configured to receive the ROTA map 110 and the one or more additional data item 1304 as an input of the DNN. The DNN further includes one or more fully connected layers coupled at an output of the DNN and configured to generate the visual field sensitivity 112 at the output of the DNN. In some embodiments, referring to FIG. 14, the one or more additional data items and the ROTA map 110 are received at an input layer of the machine learning model 120. In some embodiments, a first subset of the one or more additional data items and the ROTA map 110 are received at an input layer of the machine learning model 120, and a second subset of the one or more additional data items and the ROTA map 110 are received at an input of a hidden or output layer of the machine learning model 120. In some embodiments, referring to FIG. 15, the machine learning model 120 includes a plurality of parallel neural networks (e.g., the DNN heads 1502). The ROTA map 110 and a subset of the one or more additional data items are processed separately by two of the plurality of parallel neural networks. The two parallel neural networks are coupled to an output neural network (e.g., the fully connected layers 906 in FIG. 15).

In some embodiments, the machine learning model 120 is a multi-headed deep neural network (DNN) model that includes a plurality of parallel DNN heads 1502 and an ensemble network. The ensemble network includes one or more fully connected layers. Referring to FIG. 15, the computer system 1100 applies the machine learning model 120 by applying one of the plurality of parallel DNN heads to process the ROTA map 110, applying each of a remainder of the plurality of parallel DNN heads to process a respective additional data item, and combining the processed ROTA map 110 and respective processed additional data items using the ensemble network to determine the visual field sensitivity 112 of the retina. The plurality of parallel DNN heads 1502 are independent of each other (i.e., identical or different from each other). Each of the plurality of DNN heads is trained for processing the ROTA map 110 or a respective additional data item (e.g., a thickness map).

In some embodiments, the visual field sensitivity 112 includes one or more local visual field sensitivity values corresponding to one or more visual field locations. The computer system 1100 sets a starting brightness level of a light stimulus to be projected at each of the corresponding visual field locations of an eye in a subsequent perimetry test (e.g., in FIGS. 7A-7C) based on each of a respective subset of the one or more local visual field sensitivity values determined by the machine learning model 120.

In some embodiments, the OCT device 102 is located at a venue. A server 106 is remote from the OCT device 102 and trains the machine learning model 120. The machine learning model 120 is deployed to the OCT device 102 or a computer device 104 distinct from the OCT device 102. Alternatively, in some embodiments, the OCT device 102 is located at one venue and a server 106 remote from the OCT device 102 trains the machine learning model 120. The server receives the plurality of cross-sectional scan images 108 via one or more communication networks 118. The visual field sensitivity 112 is determined from the plurality of scan images 108 by ROTA imaging and post-processing at the server 106, and provided to a computer device 104C to be reviewed by an optometrist, doctor, ophthalmologist, or patient.

It should be understood that the particular order in which the operations in FIG. 21 have been described are merely exemplary and are not intended to indicate that the described order is the only order in which the operations could be performed. One of ordinary skill in the art would recognize various ways to monitoring a visual field of a patient's eye as described herein. Additionally, it should be noted that details of other processes described above with respect to FIGS. 1-20 are also applicable in an analogous manner to the method 2100 described above with respect to FIG. 21. For brevity, many of these details are not repeated here.

Clause 1. A computer-implemented method for evaluating visual fields of patients' eyes, comprising: obtaining a plurality of cross-sectional scan images of a retina captured by an optical coherence tomography (OCT) device, the retina having an inner retinal layer; generating a retinal optical texture analysis (ROTA) map of the inner retinal layer from the plurality of cross-sectional scan images, the ROTA map including a plurality of pixels, wherein each pixel of the ROTA map corresponds to a respective signature value S providing information about tissue composition and optical density of the inner retinal layer at a respective retinal location; and applying a machine learning model to process the ROTA map of the inner retinal layer to determine visual field sensitivity of the retina.

Clause 2. The method of clause 1, wherein generating the ROTA map of the inner retinal layer from the plurality of cross-sectional scan images comprises: identifying a plurality of boundary lines of the inner retinal layer of the retina in each of the plurality of cross-sectional scan images of the retina; determining a reflectance value P of each pixel in the inner retinal layer of the retina; and for each pixel of the ROTA map corresponding to the respective retinal location, determining the signature value S corresponding to the retinal location based on a set of reflectance values P extracted from one or more corresponding cross-sectional scan images.

Clause 3. The method of clause 1 or 2, wherein the visual field sensitivity of the retina includes one or more of: one or more local visual field sensitivity values, each of which corresponds to a local sensitivity level of a distinct selected visual field location; one or more regional visual field sensitivity indexes indicating a regional sensitivity level of a selected region of the retina; and one or more global visual field sensitivity indexes indicating an overall sensitivity level of the retina.

Clause 4. The method of clause 3, wherein a respective visual field location associated with each local visual field sensitivity value corresponds to a retinal location within a scanned portion of the retina or a retinal location external to the scanned portion of the retina.

Clause 5. The method of any of clauses 1-4, wherein applying the machine learning model to process the ROTA map of the inner retinal layer to determine visual field sensitivity comprises: based on the machine learning model, determining a plurality of local visual field sensitivity values corresponding to a plurality of distinct visual field locations; and combining the plurality of local visual field sensitivity values to generate a map of visual field sensitivity of the retina.

Clause 6. The method of any of clauses 1-5, wherein, in accordance with a selected one of a plurality of visual field test patterns, the visual field sensitivity of the retina includes a predefined number of local visual field sensitivity values corresponding to a predefined number of visual field locations.

Clause 7. The method of any of clauses 1-6, wherein the machine learning model is a deep neural network (DNN) model and includes one or more of: a convolutional neural network (CNN) including one or more convolutional blocks; a transformer neural network including one or more self-attention blocks; and a multi-layered perceptron neural network including one or more multi-layer perceptron blocks.

Clause 8. The method of any of clauses 1-7, wherein: the machine learning model includes a convolutional neural network (CNN); the CNN is configured to receive at least a portion of the ROTA map of the inner retinal layer and to output the visual field sensitivity; the CNN further includes an input unit, a series of convolutional blocks coupled to the input unit, and one or more fully connected layers coupled to the series of convolutional blocks; and the input unit is configured to receive at least a portion of the ROTA map of the inner retinal layer, each convolutional block includes one or more serial convolutional layers, and the one or more fully connected layers are configured to generate the visual field sensitivity.

Clause 9. The method of clause 8, further comprising: training the CNN using a training dataset in a supervised manner, wherein the training dataset includes a plurality of data pairs, each pair comprising a respective ROTA map and a respective visual field sensitivity.

Clause 10. The method of clause 1-9, wherein the visual field sensitivity includes one or more local visual field sensitivity values, and the method further comprises: receiving information identifying one or more distinct visual field locations corresponding to the visual field sensitivity of the retina; and training the machine learning model to predict the one or more local visual field sensitivity values at the one or more visual field locations.

Clause 11. The method of any of clauses 1-10, further comprising: training the machine learning model using a training dataset including a plurality of data pairs of ROTA maps and visual field sensitivities of one or more first visual field locations; wherein the visual field sensitivity of the retina determined by the machine learning model includes visual field sensitivity of one or more target visual field locations that are distinct from the one or more first visual field locations.

Clause 12. The method of any clauses 1-11, wherein the visual field sensitivity includes one or more local visual field sensitivity values, and the method further comprises: predicting a respective retinal location corresponding to each of the one or more local visual field sensitivity values; while applying the machine learning model to process the ROTA map, extracting a series of features from outputs of one or more intermediate layers of the machine learning model, and determining a respective weight for each of the extracted series of features; and visualizing the extracted series of features according to the respective weights in a heatmap image.

Clause 13. The method of clause 12, further comprising visually highlighting a trajectory of a set of one or more retinal nerve fiber bundles related to the visual field sensitivity based on a respective weight of each feature of the extracted series of features, including: in accordance with a determination that a first subset of the extracted series of features is associated with the visual field sensitivity, assigning first weights to the first subset of extracted features, the trajectory related to the first subset of the extracted series of features; and in accordance with a determination that a second subset of the extracted series of features is not associated with the visual field sensitivity, assigning second weights to the second subset of extracted features, the first weights greater than the second weights.

Clause 14. The method of any of clauses 1-13, further comprising: obtaining additional data items, including one or more of: patient age, patient gender, a refractive error, a thickness map of the inner retinal layer, a projection image of a scanned portion of the retina, a fundus image of the retina, a retinal blood vessel layout image, a subset of the plurality of cross-sectional scan images of the retina, one or more cross-sectional scan images of an anterior segment of the eye, and a plurality of ocular geometrical parameters including axial length and corneal curvature; wherein the machine learning model is applied to process the ROTA map and the additional data items jointly to determine the visual field sensitivity of the retina.

Clause 15. The method of clause 14, wherein: the machine learning model is a deep neural network (DNN) configured to receive the ROTA map as an input of the DNN; and the DNN further includes one or more intermediate layers configured to incorporate the additional data items and determine the visual field sensitivity of the retina based on the additional data items.

Clause 16. The method of clause 14, wherein: the machine learning model is a deep neural network (DNN) configured to receive the ROTA map and the one or more additional data item at an input of the DNN; wherein the DNN further includes one or more intermediate layers that are (i) coupled at an output of the DNN and (ii) configured to generate the visual field sensitivity at the output of the DNN.

Clause 17. The method of clause 14, wherein the machine learning model is a multi-headed deep neural network (DNN) model that includes a plurality of parallel DNN heads and an ensemble network including one or more fully connected layers, and applying the machine learning model comprises: applying one of the plurality of parallel DNN heads to process the ROTA map; applying each of a remainder of the plurality of parallel DNN heads to process a respective additional data item; and combining the processed ROTA map and respective processed additional data items using the ensemble network to determine the visual field sensitivity of the retina.

Clause 18. The method of any of clauses 1-17, wherein the visual field sensitivity includes one or more local visual field sensitivity values corresponding to one or more visual field locations, the method further comprising: setting a starting brightness level of a stimulus to be projected at each of the corresponding visual field locations of an eye in a subsequent perimetry test based on a respective subset of the one or more local visual field sensitivity values determined by the machine learning model.

Clause 19. The method of any of clauses 1-18, wherein the inner retinal layer is one of: a retinal nerve fiber layer, a ganglion cell layer, an inner plexiform layer, a combination of the retinal nerve fiber layer and the ganglion cell layer, a combination of the ganglion cell layer and the inner plexiform layer, or a combination of the retinal nerve fiber layer, the ganglion cell layer, and the inner plexiform layer.

Clause 20. The method of any of clauses 1-19, wherein the OCT device is located at a venue, the method further comprising: training the machine learning model at a server remote from the OCT device; and deploying the machine learning model to the OCT device or a local computer device distinct from the OCT device.

Clause 21. The method of any of clauses 1-19, wherein the OCT device is located at a venue and the method further comprises: training the machine learning model at a first server remote from the OCT device; deploying the machine learning model to a second server remote from the OCT device; and receiving by the second server the plurality of cross-sectional scan images or the ROTA map generated directly on the OCT device via one or more communication networks, wherein the method is implemented at the second server.

Clause 22. A computer system, comprising: one or more processors; and memory having instructions stored thereon, which when executed by the one or more processors cause the processors to perform the method of any of clauses 1-21.

Clause 23. A non-transitory computer-readable medium, having instructions stored thereon, which when executed by one or more processors of a computer system cause the one or more processors to perform the method of any of clauses 1-21.

In one or more examples, the functions described may be implemented in hardware, software, firmware, or any combination thereof. When implemented in software, the functions may be stored on or transmitted over, as one or more instructions or code, on a computer-readable medium, and executed by a hardware-based processing unit. Computer-readable media may include computer-readable storage media, which corresponds to a tangible medium such as a data storage medium, or communication media including any medium that facilitates transfer of a computer program from one place to another (e.g., according to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the embodiments described in the present application. A computer program product may include a computer-readable medium.

The terminology used in the description of the embodiments herein is for the purpose of describing particular embodiments only and is not intended to limit the scope of claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first and second may be used herein to identify various elements, these elements should not be limited by these terms. These terms are only used to distinguish one element from another. For example, a first electrode could be termed a second electrode, and, similarly, a second electrode could be termed a first electrode, without departing from the scope of the embodiments. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative embodiments will be apparent to those of ordinary skill in the art having the benefit of the teachings presented in the foregoing descriptions and the associated drawings. The embodiments were chosen and described in order to explain the principles of the invention, the practical applications, and to enable others skilled in the art to understand the invention for various embodiments and to utilize the underlying principles and various embodiments with various modifications as are suited to the particular use contemplated. Therefore, it is to be understood that the scope of claims is not to be limited to the specific examples of the embodiments disclosed and that modifications and other embodiments are intended to be included within the scope of the appended claims.

What is claimed is:

1. A computer-implemented method for evaluating visual field of a patient's eye, comprising:
    obtaining a plurality of cross-sectional scan images of a retina captured by an optical coherence tomography (OCT) device, the retina having an inner retinal layer;
    generating a retinal optical texture analysis (ROTA) map of the inner retinal layer from the plurality of cross-sectional scan images, the ROTA map including a plurality of pixels, wherein each pixel of the ROTA map corresponds to a respective signature value S providing information about tissue composition and optical density of the inner retinal layer at a respective retinal location; and
    applying a machine learning model to process the ROTA map of the inner retinal layer of the patient's eye to determine visual field sensitivity of the retina;
    wherein the machine learning model includes a convolutional neural network (CNN);
    where the CNN is configured to receive at least a portion of the ROTA map of the inner retinal layer and to output the visual field sensitivity;
    wherein the CNN further includes an input unit, a series of convolutional blocks coupled to the input unit, and one or more fully connected layers coupled to the series of convolutional blocks; and
    wherein the input unit is configured to receive at least a portion of the ROTA map of the inner retinal layer, each convolutional block includes one or more serial convolutional layers, and the one or more fully connected layers are configured to generate the visual field sensitivity.

2. The method of claim 1, wherein generating the ROTA map of the inner retinal layer from the plurality of cross-sectional scan images comprises:
    identifying a plurality of boundary lines of the inner retinal layer of the retina in each of the plurality of cross-sectional scan images of the retina;
    determining a reflectance value P of each pixel in the inner retinal layer of the retina; and
    for each pixel of the ROTA map corresponding to the respective retinal location, determining the signature value S corresponding to the retinal location based on a set of reflectance values P extracted from one or more corresponding cross-sectional scan images.

3. The method of claim 1, wherein the visual field sensitivity of the retina includes one or more of:
    one or more local visual field sensitivity values, each of which corresponds to a local sensitivity level of a distinct selected visual field location;
    one or more regional visual field sensitivity indexes indicating a regional sensitivity level of a selected region of the retina; and
    one or more global visual field sensitivity indexes indicating an overall sensitivity level of the retina; and
    wherein a respective visual field location associated with each local visual field sensitivity value corresponds to a retinal location within a scanned portion of the retina or a retinal location external to the scanned portion of the retina.

4. The method of claim 1, wherein, in accordance with a selected one of a plurality of visual field test patterns, the visual field sensitivity of the retina includes a predefined number of local visual field sensitivity values corresponding to a predefined number of visual field locations.

5. The method of claim 1, further comprising:
    training the CNN using a training dataset in a supervised manner, wherein the training dataset includes a plurality of data pairs, each pair comprising a respective ROTA map and a respective visual field sensitivity.

6. The method of claim 1, wherein the visual field sensitivity includes one or more local visual field sensitivity values, and the method further comprises:
    receiving information identifying one or more distinct visual field locations corresponding to the visual field sensitivity of the retina; and
    training the machine learning model to predict the one or more local visual field sensitivity values at the one or more visual field locations.

7. The method of claim 1, further comprising:
    training the machine learning model using a training dataset including a plurality of data pairs of ROTA maps and visual field sensitivities of one or more first visual field locations;
    wherein the visual field sensitivity of the retina determined by the machine learning model includes visual field sensitivity of one or more target visual field locations that are distinct from the one or more first visual field locations.

8. The method of claim 1, wherein the visual field sensitivity includes one or more local visual field sensitivity values, and the method further comprises:
    predicting a respective retinal location corresponding to each of the one or more local visual field sensitivity values;
    while applying the machine learning model to process the ROTA map, extracting a series of features from outputs of one or more intermediate layers of the machine learning model, and determining a respective weight for each of the extracted series of features; and
    visualizing the extracted series of features according to the respective weights in a heatmap image.

9. The method of claim 8, further comprising visually highlighting a trajectory of a set of one or more retinal nerve fiber bundles related to the visual field sensitivity based on a respective weight of each feature of the extracted series of features, including:
  in accordance with a determination that a first subset of the extracted series of features is associated with the visual field sensitivity, assigning first weights to the first subset of extracted features, the trajectory related to the first subset of the extracted series of features; and
  in accordance with a determination that a second subset of the extracted series of features is not associated with the visual field sensitivity, assigning second weights to the second subset of extracted features, the first weights greater than the second weights.

10. The method of claim 1, further comprising:
  obtaining additional data items, including one or more of: patient age, patient gender, a refractive error, a thickness map of the inner retinal layer, a projection image of a scanned portion of the retina, a fundus image of the retina, a retinal blood vessel layout image, a subset of the plurality of cross-sectional scan images of the retina, one or more cross-sectional scan images of an anterior segment of the eye, and a plurality of ocular geometrical parameters including axial length and corneal curvature;
  wherein the machine learning model is applied to process the ROTA map and the additional data items jointly to determine the visual field sensitivity of the retina.

11. The method of claim 10, wherein the machine learning model is a multi-headed deep neural network (DNN) model that includes a plurality of parallel DNN heads and an ensemble network including one or more fully connected layers, and applying the machine learning model comprises:
  applying one of the plurality of parallel DNN heads to process the ROTA map;
  applying each of a remainder of the plurality of parallel DNN heads to process a respective additional data item; and
  combining the processed ROTA map and respective processed additional data items using the ensemble network to determine the visual field sensitivity of the retina.

12. The method of claim 1, wherein the visual field sensitivity includes one or more local visual field sensitivity values corresponding to one or more visual field locations, the method further comprising:
  setting a starting brightness level of a stimulus to be projected at each of the corresponding visual field locations of an eye in a subsequent perimetry test based on a respective subset of the one or more local visual field sensitivity values determined by the machine learning model.

13. The method of claim 1, wherein the OCT device is located at a venue and the method further comprises:
  training the machine learning model at a first server remote from the OCT device;
  deploying the machine learning model to a second server remote from the OCT device; and
  receiving by the second server the plurality of cross-sectional scan images or the ROTA map generated directly on the OCT device via one or more communication networks, wherein the method is implemented at the second server.

14. A computer system, comprising:
  one or more processors; and
  memory having instructions stored thereon, which when executed by the one or more processors cause the processors to perform:
    obtaining a plurality of cross-sectional scan images of a retina captured by an optical coherence tomography (OCT) device, the retina having an inner retinal layer;
    generating a retinal optical texture analysis (ROTA) map of the inner retinal layer from the plurality of cross-sectional scan images, the ROTA map including a plurality of pixels, wherein each pixel of the ROTA map corresponds to a respective signature value S providing information about tissue composition and optical density of the inner retinal layer at a respective retinal location; and
    applying a machine learning model to process the ROTA map of the inner retinal layer to determine visual field sensitivity of the retina, wherein the visual field sensitivity includes one or more local visual field sensitivity values;
  wherein information identifying one or more distinct visual field locations corresponding to the visual field sensitivity of the retina is received; and
  wherein the machine learning model is trained to predict the one or more local visual field sensitivity values at the one or more visual field locations.

15. The computer system of claim 14, wherein the machine learning model is a deep neural network (DNN) model and includes one or more of:
  a convolutional neural network (CNN) including one or more convolutional blocks;
  a transformer neural network including one or more self-attention blocks; and
  a multi-layered perceptron neural network including one or more multi-layer perceptron blocks.

16. The computer system of claim 14, wherein the inner retinal layer is one of: a retinal nerve fiber layer, a ganglion cell layer, an inner plexiform layer, a combination of the retinal nerve fiber layer and the ganglion cell layer, a combination of the ganglion cell layer and the inner plexiform layer, or a combination of the retinal nerve fiber layer, the ganglion cell layer, and the inner plexiform layer.

17. The computer system of claim 14, wherein:
  the machine learning model includes a deep neural network (DNN);
  the DNN is configured to receive at least a portion of the ROTA map of the inner retinal layer and to output the visual field sensitivity;
  the DNN further includes an input unit, a series of neural network blocks coupled to the input unit, and one or more fully connected layers coupled to the series of neural network blocks; and
  the input unit is configured to receive at least a portion of the ROTA map of the inner retinal layer, each neural network block includes one or more serial hidden layers, and the one or more fully connected layers are configured to generate the visual field sensitivity.

18. A non-transitory computer-readable storage medium, having instructions stored thereon, which when executed by one or more processors of a computer system cause the one or more processors to perform:
  obtaining a plurality of cross-sectional scan images of a retina captured by an optical coherence tomography (OCT) device, the retina having an inner retinal layer;
  generating a retinal optical texture analysis (ROTA) map of the inner retinal layer from the plurality of cross-sectional scan images, the ROTA map including a plurality of pixels, wherein each pixel of the ROTA map corresponds to a respective signature value S providing information about tissue composition and optical density of the inner retinal layer at a respective retinal location; and applying a machine learning model to process the ROTA map of the inner retinal layer to determine visual field sensitivity of the retina;

wherein in accordance with a selected one of a plurality of visual field test patterns, the visual field sensitivity of the retina includes a predefined number of local visual field sensitivity values corresponding to a predefined number of visual field locations.

19. The non-transitory computer-readable storage medium of claim 18, wherein applying the machine learning model to process the ROTA map of the inner retinal layer to determine visual field sensitivity comprises:

based on the machine learning model, determining a plurality of local visual field sensitivity values corresponding to a plurality of distinct visual field locations; and combining the plurality of local visual field sensitivity values to generate a map of visual field sensitivity of the retina.

20. The non-transitory computer-readable storage medium of claim 18, wherein the OCT device is located at a venue, the non-transitory computer-readable storage medium further storing instructions for:

training the machine learning model at a server remote from the OCT device; and deploying the machine learning model to the OCT device or a local computer device distinct from the OCT device.

* * * * *